US012698906B2

(12) United States Patent
Ruan et al.

(10) Patent No.: US 12,698,906 B2
(45) Date of Patent: Aug. 4, 2026

(54) AUTOMATED RANGE HOOD FOR VENTILATING A COOKING SURFACE

(71) Applicant: Hauslane, Inc., South San Francisco, CA (US)

(72) Inventors: Jiaxing Ruan, San Francisco, CA (US); Aurelio Reyes, Mooresville, NC (US)

(73) Assignee: Hauslane, Inc., South San Francisco, CA (US)

( * ) Notice: Subject to any disclaimer, the term of this patent is extended or adjusted under 35 U.S.C. 154(b) by 711 days.

(21) Appl. No.: 18/155,899

(22) Filed: Jan. 18, 2023

(65) Prior Publication Data

US 2023/0228428 A1 Jul. 20, 2023

Related U.S. Application Data

(60) Provisional application No. 63/300,400, filed on Jan. 18, 2022.

(51) Int. Cl.
*G05B 19/042* (2006.01)
*F24C 15/20* (2006.01)

(52) U.S. Cl.
CPC ........ *F24C 15/2021* (2013.01); *G05B 19/042* (2013.01); *G05B 2219/2614* (2013.01)

(58) Field of Classification Search
CPC ............. F24C 15/2021; F24C 15/2064; G05B 19/042; G05B 2219/2614; G05B 2219/2613
See application file for complete search history.

(56) References Cited

U.S. PATENT DOCUMENTS

| | | | |
|---|---|---|---|
| 7,048,199 B2 | 5/2006 | Melink |
| 7,380,292 B1 | 6/2008 | Harris |
| 7,699,051 B2 | 4/2010 | Gagas et al. |
| 8,734,210 B2 | 5/2014 | Burdett et al. |
| 8,795,040 B2 | 8/2014 | Burdett et al. |
| 9,127,848 B2 | 9/2015 | Burdett et al. |
| 9,581,338 B2 | 2/2017 | Yamanaka et al. |
| 9,587,839 B2 | 3/2017 | Burdett et al. |
| 9,677,772 B2 | 6/2017 | Siegel et al. |
| 10,302,307 B2 | 5/2019 | Burdett et al. |
| 10,670,278 B2 | 6/2020 | Ji et al. |

(Continued)

FOREIGN PATENT DOCUMENTS

| | | |
|---|---|---|
| CN | 101793417 A | 8/2010 |
| CN | 201845195 U | 5/2011 |

(Continued)

OTHER PUBLICATIONS

Tomokazu, Yamagishi, JP 2020041777 A, Mar. 19, 2020. Translation retrieved on Nov. 15, 2025. (Year: 2020).*

(Continued)

*Primary Examiner* — Robert E Fennema
*Assistant Examiner* — Marzia T Monty
(74) *Attorney, Agent, or Firm* — Merchant & Gould P.C.

(57) ABSTRACT

An automated range hood includes a controller that selects a fan speed for one or more ventilation assemblies by identifying a minimum number of pixels that satisfy a threshold. The controller automatically turns on one or more light sources to illuminate a surface under the range hood when motion is detected or when the one or more ventilation assemblies are in use.

14 Claims, 22 Drawing Sheets

(56) References Cited

U.S. PATENT DOCUMENTS

| | | | |
|---|---|---|---|
| 10,739,015 B2 | 8/2020 | Fang et al. | |
| 10,871,442 B2 | 12/2020 | Dai et al. | |
| 10,969,115 B2 | 4/2021 | Xu et al. | |
| 10,969,116 B2 | 4/2021 | Xu | |
| 2005/0156053 A1 | 7/2005 | Melink | |
| 2008/0274683 A1 | 11/2008 | Burdett et al. | |
| 2010/0197216 A1 | 8/2010 | Liang et al. | |
| 2013/0255661 A1 | 10/2013 | Yamanaka et al. | |
| 2019/0162420 A1* | 5/2019 | Wu | F24C 15/2021 |
| 2019/0338960 A1 | 11/2019 | Ye et al. | |
| 2020/0257343 A1* | 8/2020 | Shabbir | G06F 1/206 |
| 2022/0113034 A1* | 4/2022 | Moore | F24F 11/64 |

FOREIGN PATENT DOCUMENTS

| | | | | | |
|---|---|---|---|---|---|
| CN | 102678597 A | 9/2012 | | | |
| CN | 203549972 U | 4/2014 | | | |
| CN | 103776075 A | 5/2014 | | | |
| CN | 203671706 U | 6/2014 | | | |
| CN | 204254706 U | 4/2015 | | | |
| CN | 104676689 A | 6/2015 | | | |
| CN | 104896542 A | 9/2015 | | | |
| CN | 204900303 U | 12/2015 | | | |
| CN | 205037386 U | 2/2016 | | | |
| CN | 105824265 A | 8/2016 | | | |
| CN | 105972657 A | 9/2016 | | | |
| CN | 205747057 U | 11/2016 | | | |
| CN | 106871201 A | 6/2017 | | | |
| CN | 107448999 A | 12/2017 | | | |
| CN | 107449009 A | 12/2017 | | | |
| CN | 206905061 U | 1/2018 | | | |
| CN | 206944264 U | 1/2018 | | | |
| CN | 107702173 A | 2/2018 | | | |
| CN | 108224531 A | 6/2018 | | | |
| CN | 106091056 B | 7/2018 | | | |
| CN | 108253483 A | 7/2018 | | | |
| CN | 108916932 A | 11/2018 | | | |
| CN | 108930992 A | 12/2018 | | | |
| CN | 109237580 A | 1/2019 | | | |
| CN | 109497818 A | 3/2019 | | | |
| CN | 110043926 A | 7/2019 | | | |
| CN | 107631338 B | 3/2020 | | | |
| CN | 110925804 A | 3/2020 | | | |
| CN | 109539342 B | 4/2020 | | | |
| CN | 210891839 U | * | 6/2020 | | |
| CN | 211204174 U | 8/2020 | | | |
| CN | 111981541 A | 11/2020 | | | |
| CN | 112050270 A | 12/2020 | | | |
| CN | 112146147 A | 12/2020 | | | |
| CN | 110686289 B | 1/2021 | | | |
| CN | 109945259 B | 2/2021 | | | |
| CN | 112413667 A | 2/2021 | | | |
| CN | 112781086 A | 5/2021 | | | |
| CN | 213207969 U | 5/2021 | | | |
| CN | 106704240 B | 6/2021 | | | |
| JP | 2020041777 A | * | 3/2020 | | |
| KR | 20080106009 A | * | 12/2008 | | F24C 15/2071 |
| KR | 10-1320703 B1 | 10/2013 | | | |
| KR | 10-1721541 B1 | 3/2017 | | | |
| KR | 10-2037833 B1 | 10/2019 | | | |
| WO | 2020/047938 A1 | 3/2020 | | | |

OTHER PUBLICATIONS

Xiao, Yu-Zhen, CN 210891839 U, Jun. 30, 2020. Translation retrieved on Nov. 15, 2025. (Year: 2020).*

Lee Choong Hoon, KR20080106009A, Dec. 4, 2008. Translation retrieved on Nov. 15, 2025. (Year: 2008).*

PCT International Search Report and Written Opinion in International Application PCT/US2023/060854, mailed May 16, 2023, 14 pages.

* cited by examiner

174

176

176

176

176

176

176

174

176    176

| 32 | 36.5 | 38.25 | 34 | 26.5 | 22.75 | 21.25 | 22.5 |
| 35.75 | 54.75 | 64.25 | 47.25 | 26.25 | 22.75 | 22 | 21.5 |
| 38 | 67.25 | 73.25 | 60.5 | 26.75 | 22 | 21.25 | 21.25 |
| 30 | 49 | 62.5 | 44 | 24.75 | 21.75 | 21.75 | 20.5 |
| 25 | 25.5 | 26.75 | 27 | 22.75 | 21.25 | 21.25 | 20.5 |
| 22.25 | 23 | 22.75 | 22.25 | 21.25 | 20.5 | 20.5 | 20 |
| 23.5 | 22.75 | 22.75 | 20.25 | 19.75 | 19.5 | 18.75 | 20 |
| 23.25 | 23 | 21.5 | 20 | 19.25 | 20 | 19.75 | 20 |

120°

0°

176

176

176

174

176

| 120A | Both | 120B |
|------|------|------|

45°C 180         184         182

186

|  | Speed 0 | Speed 1 | Speed 2 | Speed 3 | Speed 4 | Speed 5 | Speed 6 |
|---|---|---|---|---|---|---|---|
| 120A | 40 | 0 | 0 | 0 | 0 | 0 | 0 |
| 120B | 40 | 1 | 0 | 0 | 0 | 0 | 0 |

| | Speed 0 | Speed 1 | Speed 2 | Speed 3 | Speed 4 | Speed 5 | Speed 6 |
|---|---|---|---|---|---|---|---|
| 120A | 40 | 0 | 0 | 0 | 0 | 0 | 0 |
| 120B | 40 | 2 | 2 | 2 | 1 | 1 | 1 |

AUTOMATED RANGE HOOD FOR VENTILATING A COOKING SURFACE

CROSS REFERENCE TO RELATED APPLICATIONS

This application claims priority to U.S. Patent Application No. 63/300,400, filed Jan. 18, 2022, the disclosure of which is incorporated herein by reference in its entirety.

BACKGROUND

A range hood is a device for ventilating an area above a cooking surface to exhaust heat, odors, smoke, grease, and moisture generated from cooking on the cooking surface. Range hoods can be installed under cabinets, can be built into cabinets, or can be mounted to walls or ceilings above cooking surfaces inside a kitchen. Some range hoods send air outside such as through a duct, while other range hoods recirculate filtered air back into the kitchen. In further examples, range hoods can be installed outdoors over cooking surfaces such as barbecues and outdoor grills, or can be installed inside recreational vehicles (RV) and campers.

SUMMARY

In general terms, the present disclosure relates to a range hood. In one possible configuration, the range hood is automated to control ventilation and lighting. Various aspects are described in this disclosure, which include, but are not limited to, the following aspects.

One aspect relates to an automated range hood for ventilating a cooking surface. The automated range hood comprises: a hood housing; a first ventilation assembly mounted inside the hood housing on a first side, the first ventilation assembly including: a first electric motor; a first fan driven by the first electric motor to ventilate the cooking surface; a second ventilation assembly mounted inside the hood housing on a second side, the second side being opposite the first side, the second ventilation assembly including: a second electric motor; a second fan driven by the second electric motor to ventilate the cooking surface; a thermal camera measuring temperature values of the cooking surface; and a controller in communication with the first and second ventilation assemblies, the controller including: at least one processing device; and at least one memory device storing software instructions that, when executed by the at least one processing device, cause the controller to: receive the temperature values from the thermal camera for a plurality of pixels in an array covering the cooking surface, the array being segmented into a first portion covering a first area under the first side of the hood housing, a second portion covering a second area under the second side of the hood housing, and a third portion covering a third area under a central portion of the hood housing overlapping the first and second areas; select a first fan speed from a plurality of fan speeds for the first fan of the first ventilation assembly by identifying a highest threshold from a plurality of thresholds that is satisfied by a minimum number of pixels in the first and third portions of the array; and select a second fan speed from the plurality of fan speeds for the second fan of the second ventilation assembly by identifying a highest threshold from the plurality of thresholds that is satisfied by the minimum number of pixels in the second and third portions of the array.

Another aspect relates to a controller for a range hood. The controller comprises: at least one processing device; and at least one memory device storing software instructions that, when executed by the at least one processing device, cause the controller to: receive temperature values from a thermal camera for a plurality of pixels in an array segmented into a first portion covering a first area under the range hood, a second portion covering a second area under the range hood, and a third portion covering a third area under a central portion of the range hood overlapping the first and second areas; select a first fan speed for a first ventilation assembly by identifying a highest threshold from a plurality of thresholds satisfied by a minimum number of pixels in the first and third portions of the array; and select a second fan speed for a second ventilation assembly by identifying a highest threshold from the plurality of thresholds satisfied by the minimum number of pixels in the second and third portions of the array.

Another aspect relates to a method of operating a range hood. The method comprises: receiving temperature values from a thermal camera for a plurality of pixels in an array segmented into a first portion covering a first area under the range hood, a second portion covering a second area under the range hood, and a third portion covering a third area under a central portion of the range hood overlapping the first and second areas; selecting a first fan speed for a first ventilation assembly by identifying a highest threshold from a plurality of thresholds satisfied by a minimum number of pixels in the first and third portions of the array; and selecting a second fan speed for a second ventilation assembly by identifying a highest threshold from the plurality of thresholds satisfied by the minimum number of pixels in the second and third portions of the array.

Another aspect relates to an automated range hood for ventilating a cooking surface. The automated range hood comprises: a hood housing; a ventilation assembly mounted in the hood housing, the ventilation assembly including: an electric motor; and a fan driven by the electric motor to ventilate the cooking surface; a thermal camera measuring temperature values of the cooking surface; and a controller including: at least one processing device; and at least one memory device storing software instructions that, when executed by the at least one processing device, cause the controller to: receive the temperature values from the thermal camera for a plurality of pixels in an array covering the cooking surface; select a fan speed from a plurality of fan speeds for driving the fan by the electric motor, the fan speed being determined by identifying a highest threshold from a plurality of thresholds that is satisfied by a minimum number of pixels in the array.

Another aspect relates to a controller for a range hood. The controller comprises: at least one processing device; and at least one memory device storing software instructions that, when executed by the at least one processing device, cause the controller to: receive temperature values from a thermal camera for a plurality of pixels in an array segmented into one or more portions; and select a fan speed for a ventilation assembly by identifying a highest threshold from a plurality of thresholds satisfied by a minimum number of pixels in the array.

Another aspect relates to a sensor assembly for a range hood. The sensor assembly comprises: a base; a thermal camera mounted at an angle to an interior surface of the base, the angle of the thermal camera directing a field of view of the thermal camera toward a cooking surface; a lens mounted to an exterior surface of the base, the lens made of a silicon material structured for transmission of long-wavelength infrared light emitted from the thermal camera, and for protection of the thermal camera from cooking particles;

and a sensor mounted at an angle to the interior surface of the base, the angle of the sensor allowing for detection of motion both under and in front of the range hood.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DESCRIPTION OF THE FIGURES

The following drawing figures, which form a part of this application, are illustrative of the described technology and are not meant to limit the scope of the disclosure in any manner.

FIG. 10 schematically illustrates a table for calculating a fan speed based on the value of the pixel shown in FIG. 9, and the temperature thresholds shown in FIG. 8.

FIG. 12 schematically illustrates a table for calculating a fan speed based on values of the pixels shown in FIG. 11, and the temperature thresholds shown in FIG. 8.

DETAILED DESCRIPTION

Figure 1:
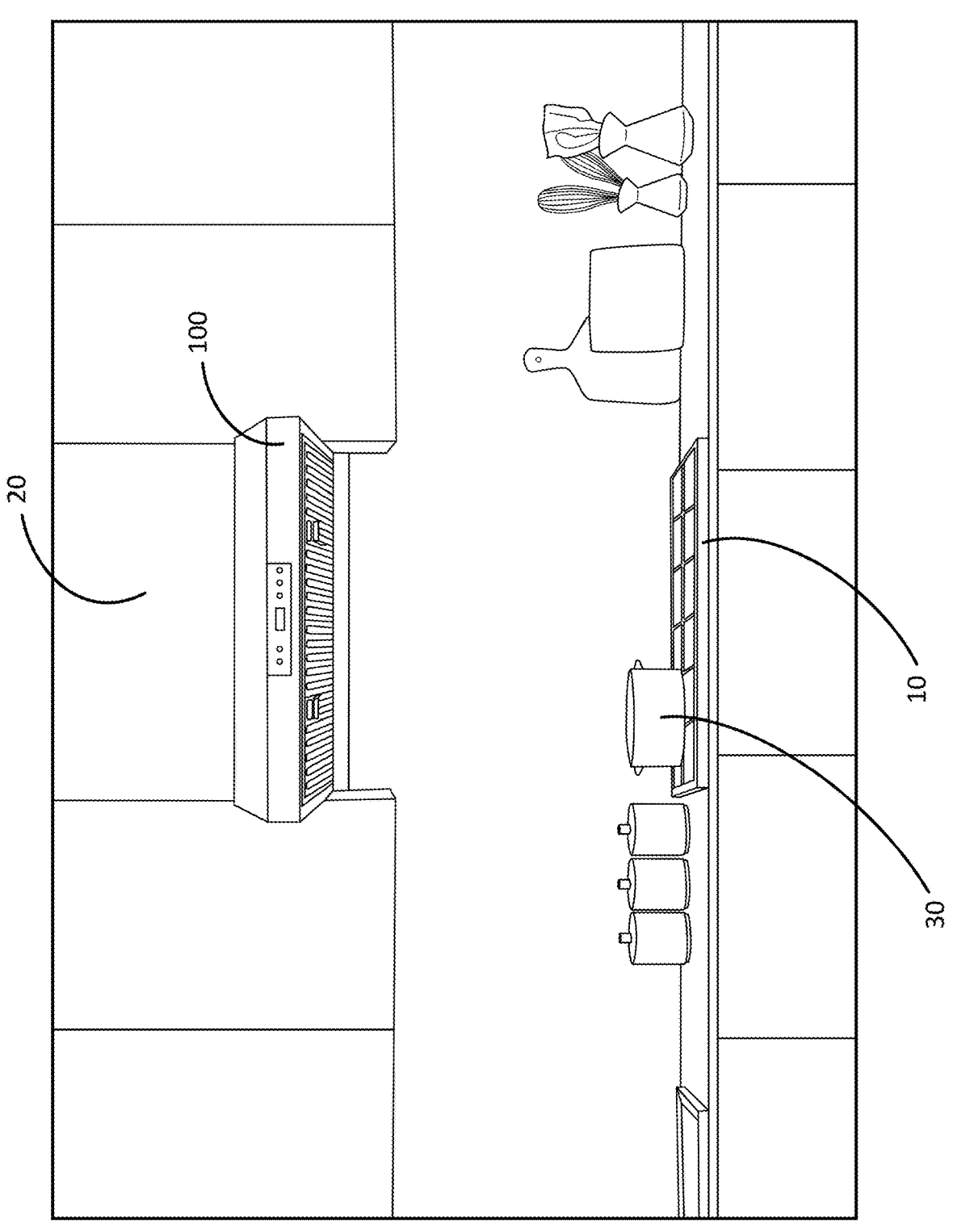
FIG. 1 is a front view of an example of a range hood installed over a cooking surface.

FIG. 1 is a front view of an example of a range hood 100 installed over a cooking surface 10. The range hood 100 is preprogrammed for automated operation. For example, the range hood 100 can automatically increase and decrease ventilation based on changes detected on the cooking surface 10 under the range hood. In one example, the range hood 100 independently operates one or more fans based on temperature changes detected in one or more areas of the cooking surface 10. Additionally, the range hood 100 can automatically illuminate the cooking surface 10 when a presence of a user is detected, or when the one or more fans of the range hood 100 are being operated due to changes detected on the cooking surface 10.

As used herein, the terms "automatic" and "automated" mean that functions of the range hood 100 are performed without requiring user input. For example, the speed of one or more fans of the range hood can be increased or decreased to adjust an amount of ventilation without requiring any user input. Similarly, one or more light sources of the range hood can be turned on and off to illuminate the cooking surface 10 without requiring any user input.

In the example shown in FIG. 1, the range hood 100 is installed underneath a cabinet 20. In other examples, the range hood 100 can be a wall mount range hood, a built-in cabinet range hood, a kitchen island range hood, and the like. In further examples, the range hood 100 can be installed outdoors over cooking surfaces such as barbecues and outdoor grills, or can be installed inside recreational vehicles (RV) and campers. Accordingly, the concepts described herein are applicable to any type of range hood for installation in various types of environments.

In the example shown in FIG. 1, the cooking surface 10 is a standalone device. In other examples, the cooking surface 10 can be integrated with an oven or kitchen stove. The cooking surface 10 can be powered by gas or electricity. The range hood 100 can be installed over any type of cooking surface including a gas cooking surface, electrical coil cooking surface, an induction cooking surface, a radiant cooking surface, and the like. In FIG. 1, a cookware item 30, such as cooking pot or pan, is placed on top of the cooking surface 10.

In some examples, the range hood 100 is configured for installation above the cooking surface 10 by a distance ranging from about 20 inches to about 30 inches. In some examples, the cooking surface 10 can have a width of about 24 inches to about 36 inches.

Figure 2:
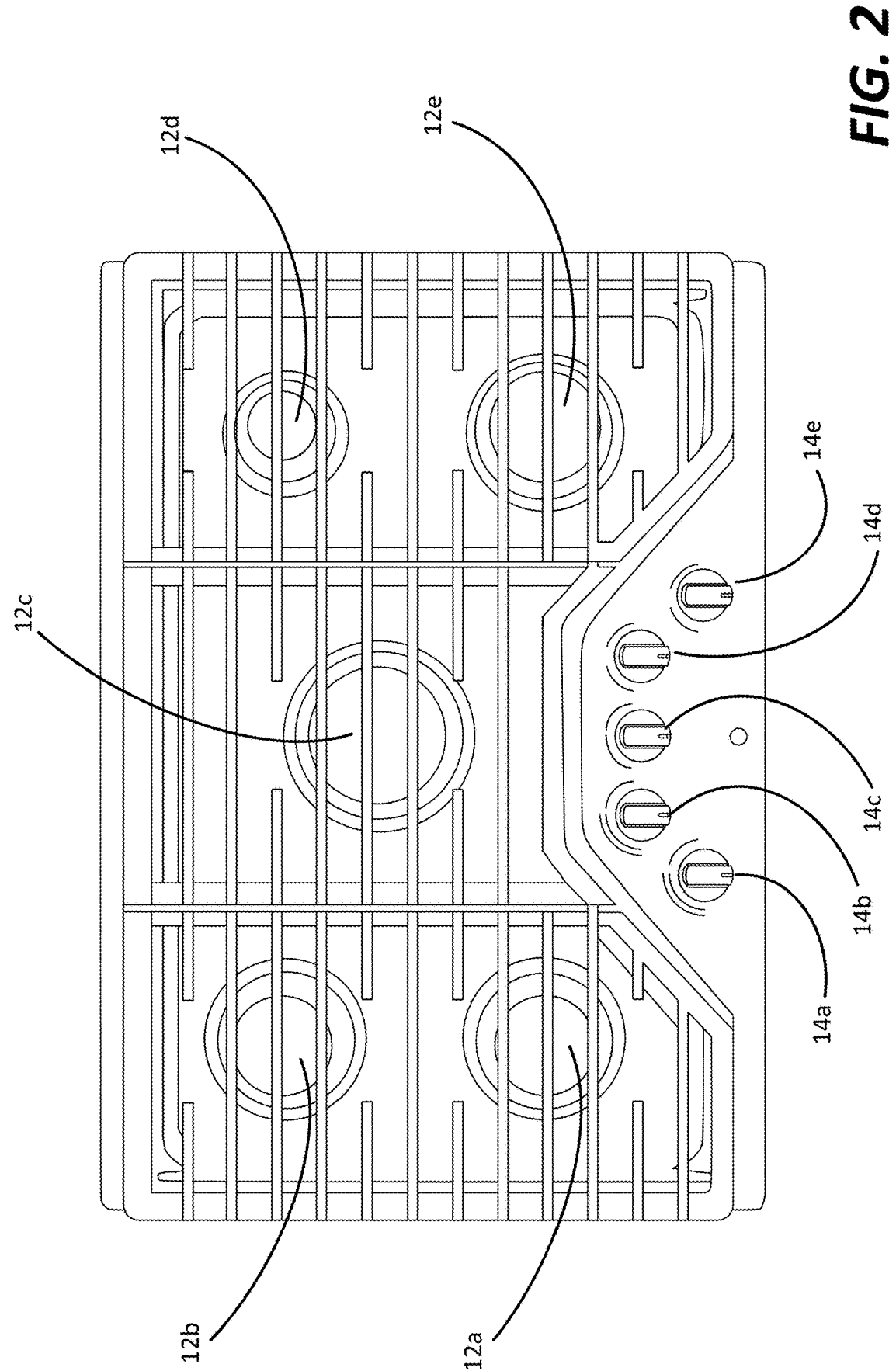
FIG. 2 is a top view of an example of the cooking surface of FIG. 1.

FIG. 2 is a top view of an example of the cooking surface 10. In this example, the cooking surface 10 includes a plurality of burners 12. For example, the cooking surface 10 includes a first burner 12a arranged in a lower left corner, a second burner 12b arranged in an upper left corner, a third burner 12c arranged in a central portion of the cooking surface 10, a fourth burner 12d arranged in an upper right corner, and a fifth burner 12e arranged in a lower right corner. The range hood 100 can be used with cooking surfaces 10 having any number and/or arrangement of burners, such that FIG. 2 is provided only for illustrative purposes.

The cooking surface 10 further includes a plurality of dials 14 for controlling or regulating the heat emitted from the burners 12. For example, a first dial 14a can be used to regulate the first burner 12a, a second dial 14b can be used to regulate the second burner 12b, a third dial 14c can be used to regulate the third burner 12c, a fourth dial 14d can be used to regulate the fourth burner 12d, and a fifth dial 14e can be used to regulate the fifth burner 12e.

Figure 3:
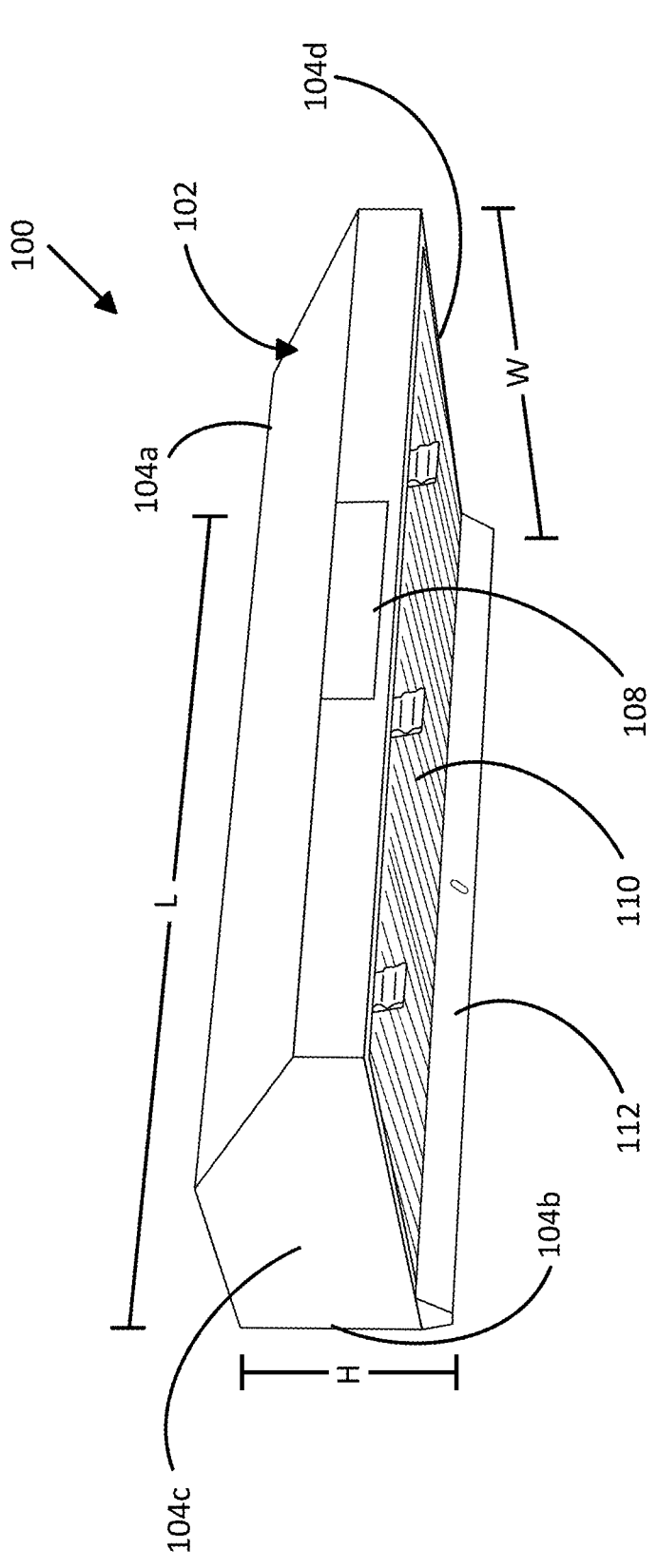
FIG. 3 is an isometric front view of the range hood of FIG. 1.
Figure 4:
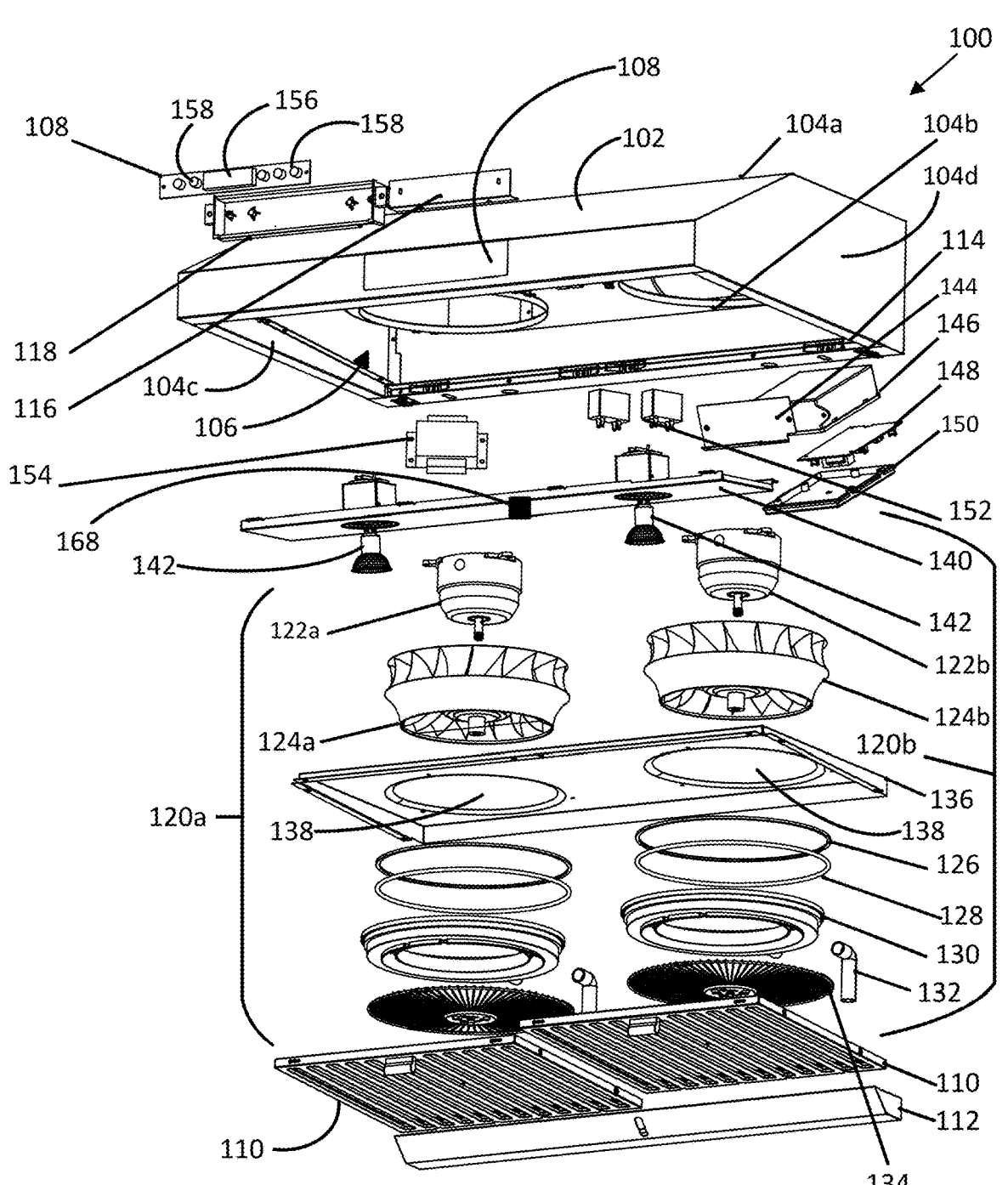
FIG. 4 is an exploded view of the range hood of FIG. 1.

FIG. 3 is an isometric front view of the range hood 100. FIG. 4 is an exploded view of the range hood 100. The range hood 100 includes a hood housing 102 having a set of panels 104 that define a cavity 106. For example, the hood housing 102 includes a top panel 104a, a rear panel 104b, a first side panel 104c, and a second side panel 104d.

As shown in FIG. 3, the hood housing 102 defines a length L, a width W, and a height H. In some examples, the length L can range from about 30 inches to about 36 inches, and the height H can be about 8 inches tall, and the width W can be about 22 inches wide. These dimensions are provided by way of example, such that the size of the range hood 100 may vary.

As further shown in FIGS. 3 and 4, the range hood 100 includes one or more baffle filters 110 that cover the cavity 106. The baffle filters 110 are constructed by interlocking baffles that provide a route through which air containing grease particles passes. The grease particles flow down the smooth surface of the baffles and collect within an oil reservoir 112. This limits the chance of build-ups that will prevent the airflow through the range hood 100.

As shown in FIG. 4, the baffle filters 110 can attach to clips 114 positioned on the rear panel 104b to secure the baffle filters 110 to the hood housing 102. In the example shown in FIG. 4, the range hood 100 includes two baffle filters. In other examples, the range hood 100 can include a single baffle filter, or can include more than two baffle filters.

As further shown in FIG. 4, the range hood 100 includes first and second ventilation assemblies 120a, 120b. The first ventilation assembly 120a is disposed on a first side of the cavity 106 adjacent to the first side panel 104c. The second ventilation assembly 120b is disposed on a second side of the cavity 106 adjacent to the second side panel 104d.

The first and second ventilation assemblies 120a, 120b each include a fan 124 driven by an electric motor 122 to ventilate an area under the range hood 100. The first ventilation assembly 120a includes a fan 124a driven by an electric motor 122a to ventilate an area under the first side of the cavity 106, such as where the first and second burners 12a and 12b of the cooking surface 10 are located (see FIG. 2). The first ventilation assembly 120a can also at least partially ventilate the area where the third burner 12c of the cooking surface 10 is located.

Similarly, the second ventilation assembly 120b includes a fan 124b driven by an electric motor 122b to ventilate the area under the second side of the cavity 106, such as where the fourth and fifth burners 12d and 12e of the cooking surface 10 are located. Additionally, the second ventilation assembly 120b can be used to ventilate the area at least partially under the range hood 100 where the third burner 12c of the cooking surface 10 is located.

While the example shown in FIG. 4 shows the range hood 100 as having two ventilation assemblies, it is contemplated that the range hood 100 can have only one ventilation assembly, or can have more than two ventilation assemblies. Accordingly, the concepts described herein are not limited to a range hood having two ventilation assemblies.

As further shown in FIG. 4, each of the first and second ventilation assemblies 120a, 120b can further include an oil ring seal 126, an oil ring guide 128, an oil ring cover 130, and an oil drain tube 132 that allow collected grease to flow down into the oil reservoir 112. Also, the first and second ventilation assemblies 120a, 120b can each include a filter grid 134 to filter the air before it reaches the fans 124a, 124b respectively driven by the electric motors 122a, 122b.

The range hood 100 further includes a bottom plate 136 to shield the first and second ventilation assemblies 120a, 120b and other internal components of the range hood 100 including a controller 148, one or more capacitors 152, and a transformer 154 inside the cavity 106 of the hood housing 102. The bottom plate 136 includes apertures 138 for allowing air under the range hood to reach the fans 124a, 124b of the first and second ventilation assemblies 120a, 120b.

As further shown in FIG. 4, the range hood 100 further includes a lighting fixture holder 140 for mounting one or more light sources 142 that can be used to illuminate a surface under the range hood 100 such as the cooking surface 10. The lighting fixture holder 140 is mounted to a front end of the hood housing 102. In other examples, the lighting fixture holder 140 can be mounted to a rear end of the hood housing 102. As will be described in more detail, the range hood 100 is preprogrammed to have the light sources 142 automatically turn on when the presence of a user is detected near the range hood 100, and to have the light sources 142 automatically turn off after a predetermined amount of time. In some examples, the predetermined amount of time can be set by a user of the range hood 100.

The range hood 100 further includes a holder 144 for an electronics housing 146 in which the controller 148 is housed. The electronics housing 146 can include a removable cover 150 for providing access to the controller 148. As will be described in more detail, the controller 148 is programmed to automate the operation of the first and second ventilation assemblies 120a, 120b such that the speed of the fans 124a, 124b respectively driven by the electric motors 122a, 122b are automatically controlled without requiring user input.

As further shown in FIG. 4, the range hood 100 further includes a bracket 116 for securing a housing 118 of a user interface 108 to the hood housing 102. The user interface 108 can include a display 156 such as to display the time and settings of the range hood 100. Also, the user interface 108 can include one or more controls 158 that can be operated by a user of the range hood 100 to adjust one or more settings of the range hood 100.

Figure 5:
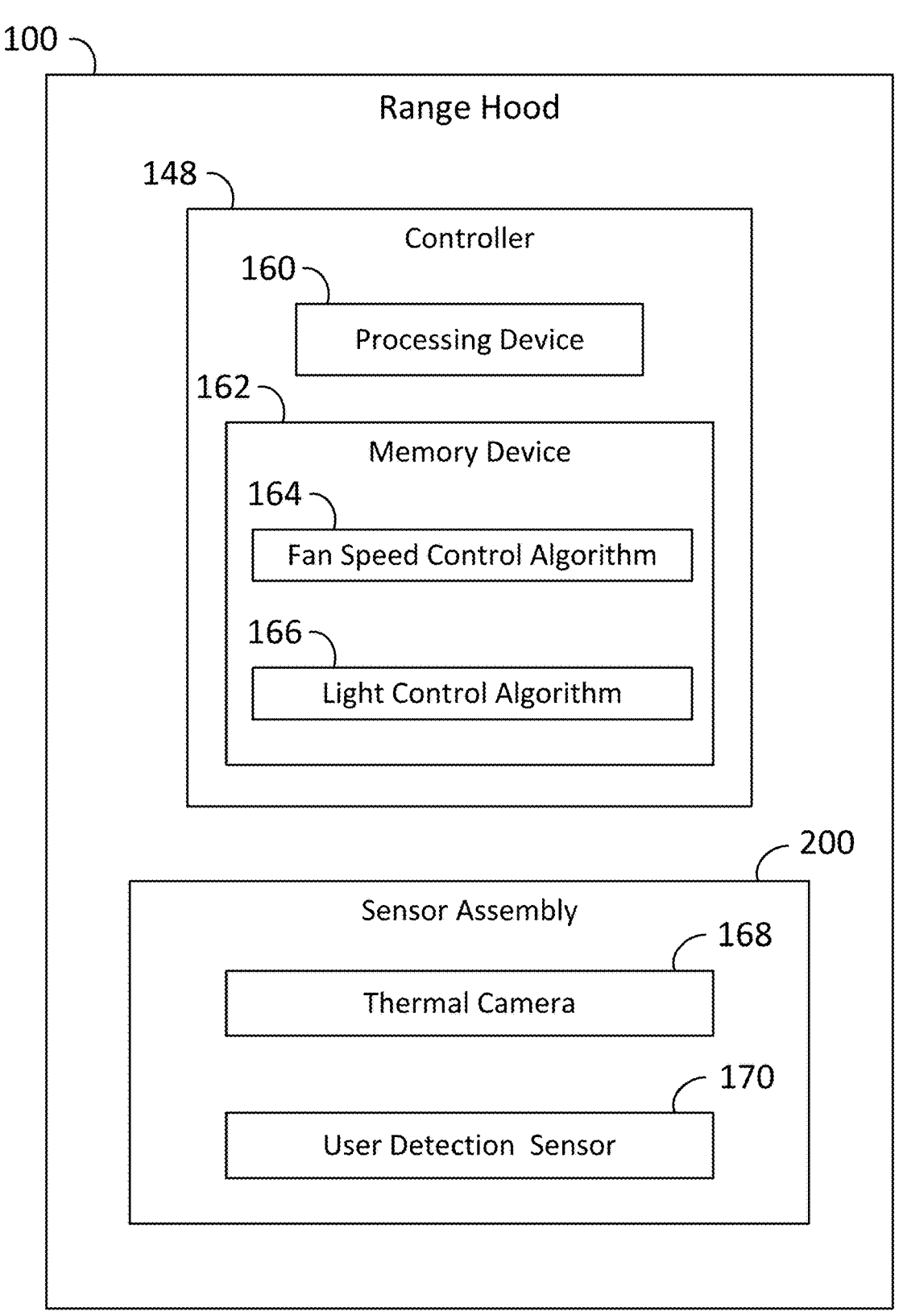
FIG. 5 schematically illustrates an example of the range hood of FIG. 1.

FIG. 5 schematically illustrates an example of the range hood 100. As shown in FIG. 5, the range hood 100 includes the controller 148 (see also FIG. 4). The controller 148 includes at least one processing device 160 and a memory device 162. In some examples, the controller 148 includes electronic switching components such as triodes for alternating current (TRIACs) to reduce electromagnetic interference (EMI) with other electronic appliances that are nearby. The TRIACs can replace mechanical switching relays.

The processing device 160 is an example of a processing unit such as a central processing unit (CPU). The processing device 160 can include one or more CPUs. In some examples, the processing device 160 is a microcontroller that can include one or more digital signal processors, field-programmable gate arrays, and other types of electronic circuits.

The memory device 162 operates to store data and instructions for execution by the processing device 160, including instructions for automating the operation of the range hood 100. For example, the memory device 162 is preprogrammed to include a fan speed control algorithm 164 and a light control algorithm 166, which are described in more detail below.

The memory device 162 includes computer-readable media, which may include any media that can be accessed by the processing device 160. By way of example, computer-readable media include computer readable storage media and computer readable communication media.

Computer readable storage media includes volatile and nonvolatile, removable, and non-removable media implemented in any device configured to store information such as computer readable instructions, data structures, program modules, or other data. Computer readable storage media can include, but is not limited to, random access memory, read only memory, electrically erasable programmable read only memory, flash memory, and other memory technology, including any medium that can be used to store information that can be accessed by the processing device 160. The computer readable storage media is non-transitory.

Computer readable communication media embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are within the scope of computer readable media.

As shown in FIG. 5, the range hood 100 further includes a sensor assembly 200 that includes a thermal camera 168 and a user detection sensor 170 that are in communication with the controller 148. The thermal camera 168 and the user detection sensor 170 connect to the controller 148 through one or more wired or wireless connections, or combinations thereof.

Figure 6:
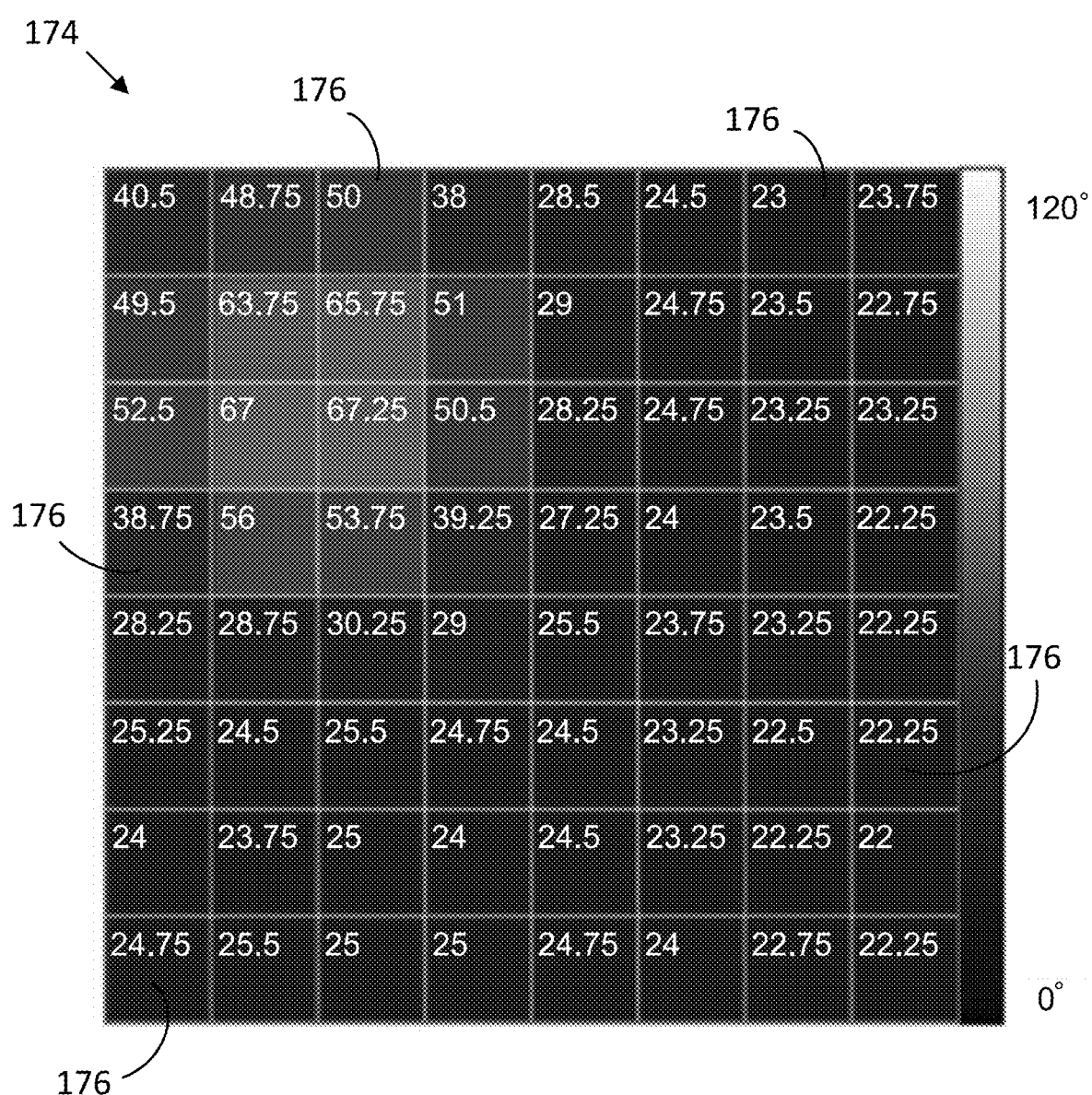
FIG. 6 illustrates an example of an array that includes a plurality of pixels for thermally mapping the cooking surface under the range hood of FIG. 1.
Figure 7:
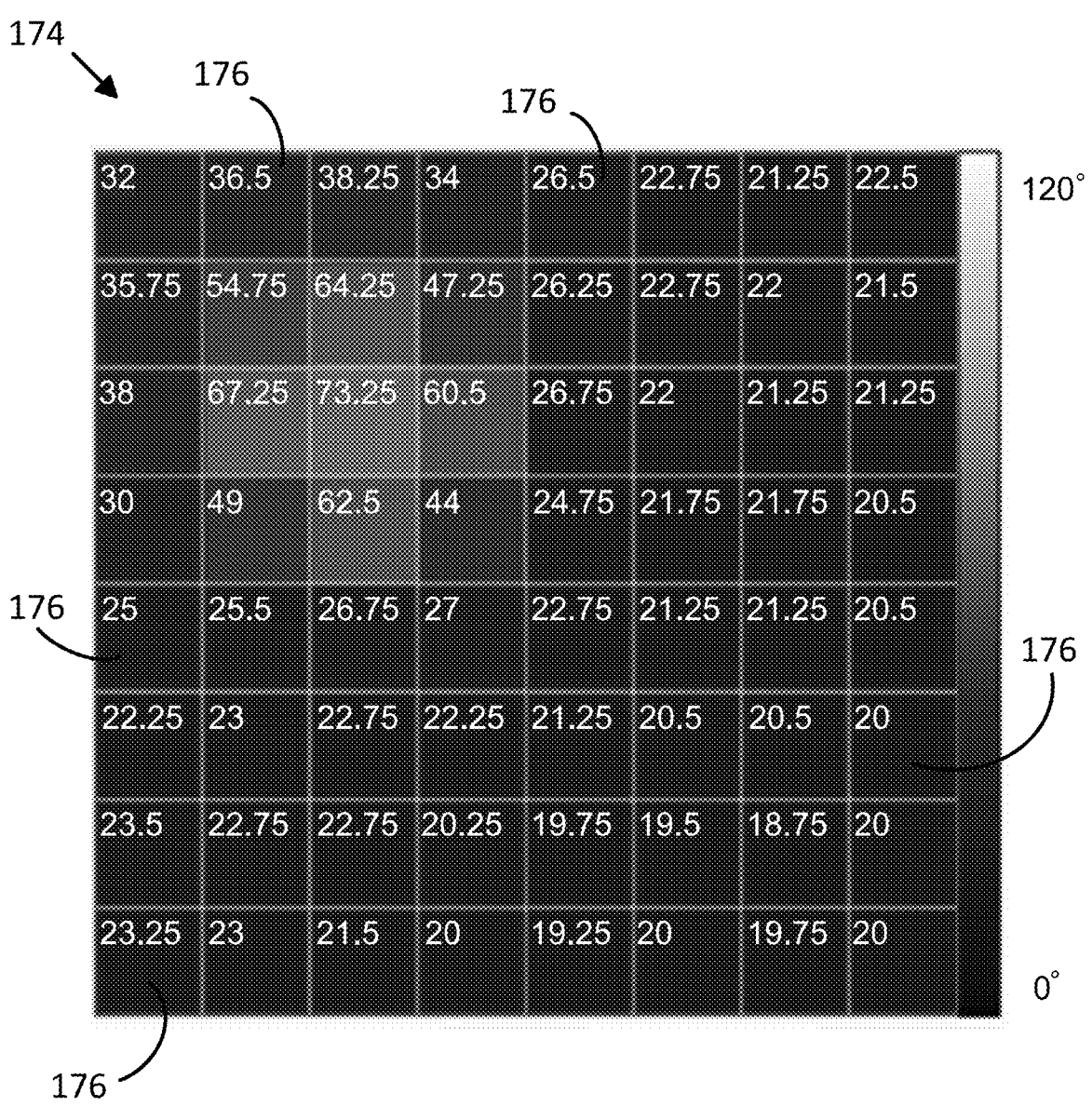
FIG. 7 illustrates another example of an array that includes a plurality of pixels for thermally mapping the cooking surface under the range hood of FIG. 1.

The thermal camera 168 is an example of a sensor that can be used to measure heat under the hood housing 102. The thermal camera 168 detects temperature distribution in a two-dimensional area without contact. For example, the thermal camera 168 provides thermal mapping of the cooking surface 10 to detect which areas on the cooking surface 10 are being used for cooking, and to quantify heat emitted from these areas. In certain examples, the thermal camera 168 is an 8×8, 64-pixel infrared array sensor. The thermal camera 168 can generate an array having a plurality of pixels, in which each pixel has a separate temperature value. Examples of arrays generated by the thermal camera 168 are shown in FIGS. 6 and 7.

The data acquired from the thermal camera 168 can be used by the controller 148 to determine a desired level of ventilation by the first and second ventilation assemblies 120a, 120b. For example, the data collected from the thermal camera 168 can be used by the controller 148 adjust the speed of the speed of the fans 124a, 124b driven by the electric motors 122a, 122b.

In FIG. 5, the sensor assembly 200 further includes the user detection sensor 170 that is in communication with the controller 148. In some examples, the user detection sensor 170 is a time-of-flight sensor that emits a beam of infrared light, and detects changes in a return signal to determine whether an object has moved relative to the range hood 100 or cooking surface 10. The controller 148 can use the sensed data acquired from the user detection sensor 170 to determine whether a user is present next to the range hood 100 and/or cooking surface 10, such as to automatically turn on the light sources 142 to illuminant the cooking surface 10, and to automatically turn off the light sources 142 when it is detected that the user is not present next to the range hood 100 and/or cooking surface 10 to conserve electricity.

In alternative examples, the sensor assembly 200 does not include a user detection sensor 170 that is separate from the thermal camera 168. Instead, the controller 148 can use the sensed data acquired from the thermal camera 168 to determine whether a user is present next to the range hood 100 and/or cooking surface 10. In such examples, the functions of measuring heat under the hood housing 102 and detecting user presence under the hood housing 102 are both performed by a single sensor such as the thermal camera 168.

Also, in some further examples, the sensor assembly 200 can further include an additional sensor to measure a distance between the range hood 100 and the cooking surface 10 to optimally adjust one or more algorithms for operating the first and second ventilation assemblies 120a, 120b. In some examples, user detection sensor 170 can be used to measure the distance to the cooking surface 10. In such examples, the functions of detecting user presence and measuring the distance between the range hood 100 and the cooking surface 10 are both performed by a single sensor such as the user detection sensor 170.

FIGS. 6 and 7 respectively illustrate examples of an array 174 that includes a plurality of pixels 176 for thermally mapping an area under the range hood 100, such as the cooking surface 10. The array 174 is produced by the thermal camera 168. In this example, the array 174 is an 8×8, 64-pixel array. Alternative sizes for the array 174 are also possible.

Each pixel 176 in the array 174 has a value detected from a surface under the range hood 100, such as the cooking surface 10. In the examples shown in FIGS. 6 and 7, the values are temperature values in degrees Celsius. In other examples, the values can have other units of temperature (e.g., degrees Fahrenheit), or can have other units that quantify heat emission including, for example, watts (W), joules (J), British Thermal Units (BTU), calories, and the like.

As shown in FIGS. 6 and 7, the pixels 176 in the upper left corner have higher values than the remaining pixels of the array 174. This indicates that the burner 12b (see FIG. 2) in the upper left corner of the cooking surface 10 is being used for cooking, while the remaining burners 12a, 12c, 12d, and 12e are not being used for cooking. The controller 148 uses this information to activate the first ventilation assembly 120a disposed on the first side of the cavity 106 adjacent to the first side panel 104c to ventilate the area above the burner 12b. Also, the controller can use this information to determine that the second ventilation assembly 120b disposed on the second side of the cavity 106 adjacent to the second side panel 104d does not need to be activated because the burners 12a, 12c, 12d, and 12e are not being used for cooking. Advantageously, this can make the range hood 100 more energy efficient and reduce fan noise.

The controller 48 can independently operate the first and second ventilation assemblies 120a, 120b such that the fan 124 of one ventilation assembly is powered on for ventilation, while the fan 124 of the other ventilation assembly is inactive. For example, the fan 124a of the first ventilation assembly 120a can be powered by the electric motor 122a for ventilation while the electric motor 122b and fan 124b of the second ventilation assembly 120b are inactive. Also, the fan 124b of the second ventilation assembly 120b can be powered by the electric motor 122b while the electric motor 122a and fan 124a of the first ventilation assembly 120a are inactivate. Also, both fans 124a, 124b of the first and second ventilation assemblies 120a, 120b can be powered by the electric motors 122a, 122b simultaneously such as when burners on both sides of the cooking surface 10 are being used for cooking, and/or when the burner 12c in the central portion of the cooking surface 10 is being used for cooking.

As shown in the example of FIGS. 6 and 7, the pixels 176 in the upper left corner in FIG. 7 have higher values (e.g., a maximum value of 73 degrees Celsius) than the pixels 176 in the upper left corner in FIG. 6 (e.g., a maximum value of 67 degrees Celsius). This indicates that the cookware item 30 (see FIG. 1) on the burner 12b has increased in temperature such as due to increased cooking time and/or increased heat emitted from the burner 12b (e.g., by regulation of the second dial 14b). The controller 148 uses this information to operate the electric motor 122a to increase the speed of the fan 124a to increase the ventilation of the area above the burner 12b.

The controller 48 can also independently operate the speed of the fans 124a, 124b of the first and second ventilation assemblies 120a, 120b to have different fan speeds based on the values of the pixels 176 in the array 174. This can occur when both the first and second ventilation assemblies 120a, 120b are being powered by their respective electric motors.

Figure 8:
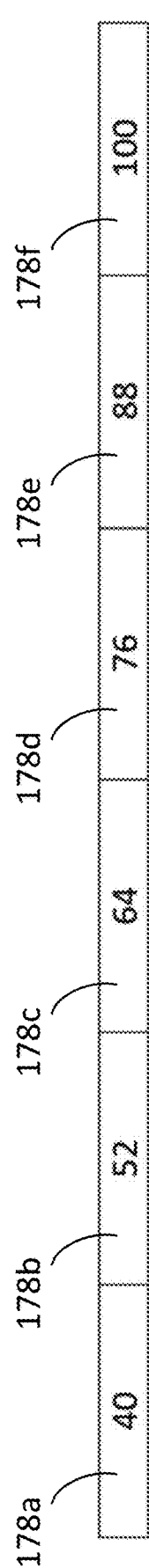
FIG. 8 illustrates an example of temperature thresholds for operating first and second fans of the range hood of FIG. 1.

FIG. 8 illustrates an example of temperature thresholds 178a-178f for operating the fans 124a, 124b of the range hood 100. The temperature thresholds 178a-178f are variable and programmable, and can be stored on the memory device 162 of the controller 148. In this example, there are six temperature thresholds for operating the fans 124a, 124b under six different fan speeds. In further example embodiments, there can be more than six temperature thresholds or fewer than six temperature thresholds for operating the fans 124a, 124b of the ventilation assemblies under additional or fewer fan speeds.

In FIG. 8, the temperature thresholds 178a-178f range between about 40° C. and about 100° C. For example, a first temperature threshold 178a is 40° C., a second temperature threshold 178b is 52° C., a third temperature threshold 178c is 64° C., a fourth temperature threshold 178d is 76° C., a fifth temperature threshold 178e is 88° C., and a sixth temperature threshold 178f is 100° C. The temperature thresholds 178a-178f are variable such that the temperature thresholds shown in FIG. 8 are provided by way of illustrative example. Also, the units of measurement used for measuring the pixels and for defining the temperature thresholds may vary to include degrees Fahrenheit, watts (W), joules (J), British Thermal Units (BTU), calories, and the like.

In some examples, the temperature thresholds 178a-178f can be adjusted based on the type of heating by the cooking surface 10 such as gas, induction, electrical coil, radiant, and the like. In further examples, the temperature thresholds 178a-178f can be adjusted based on a distance to the cooking surface 10 that can be detected by the sensor assembly 200.

The adjustment of the temperature thresholds 178a-178f allows the range hood 100 to be used with various types of cooking surfaces 10 by different manufacturers.

In some further examples, the temperature thresholds 178a-178f are adjusted based on the type of food items and/or type of cooking on the cooking surface such as boiling pasta, grilling meat, stir-fry, and the like. In some examples, the type of cooking surface, the type of food items being cooked on the cooking surface, and/or the type of cooking being done on the cooking surface can be manually entered by a user of the range hood 100 such as by using the user interface 108 or a mobile application connected to the range hood 100.

In further examples, the type of cooking surface, the type of food items being cooked on the cooking surface, and/or the type of cooking being done on the cooking surface can be automatically detected by the controller 148 based on data from the thermal camera 168. In some examples, the controller 148 determines the type of cooking surface, the type of food items being cooked, and/or the type of cooking done on the cooking surface by using artificial intelligence such as machine learning algorithms that use the data from the thermal camera 168.

As an illustrative example, the first temperature threshold 178a can be defined for a first fan speed of about 755 RPM, the second temperature threshold 178b can be defined for a second fan speed of about 950 RPM, the third temperature threshold 178c can be defined for a third fan speed of about 1300 RPM, the fourth temperature threshold 178d can be defined for a fourth fan speed of about 1400 RPM, the fifth temperature threshold 178e can be defined for a fifth fan speed of about 1525 RPM, and the sixth temperature threshold 178f can be defined for a sixth fan speed of about 1650 RPM. The fan speeds associated with each of the temperature thresholds 178a-178f may vary in other example embodiments. In some examples, the fan speeds associated with the temperature thresholds 178a-178f are adjustable based on the type of cooking surface (e.g., gas, induction, electrical coil, radiant, etc.) and/or the distance to the cooking surface. In further examples, the fan speeds associated with the temperature thresholds 178a-178f are adjustable based on the type of food items being cooked on the cooking surface, and/or the type of cooking (e.g., boiling, grilling, stir-fry, etc.) being done on the cooking surface.

Figure 9:
FIG. 9 illustrates an example of the array of FIG. 6 with at least one pixel having a value that satisfies at least one temperature threshold from FIG. 8.

FIG. 9 illustrates an example of the array 174 segmented into a first portion 180 covering an area above the burners 12a, 12b, a second portion 182 covering an area above the burners 12d, 12e, and a third portion 184 covering an area above the burner 12c. The first portion 180 is associated with control of the first ventilation assembly 120a, the second portion 182 is associated with control of the second ventilation assembly 120b, and the third portion 184 is associated with control of both the first and second ventilation assemblies 120a, 120b. In this example, the array 174 includes a pixel 176 in the second portion 182 having a value that satisfies at least one of the temperature thresholds 178 shown in FIG. 8.

In this example, a pixel 176 in the second portion 182 has a value of 45° C. that satisfies the first temperature threshold 178a while the remaining pixels in the array 174 have values less than 40° C., such that they do not satisfy any of the temperature thresholds 178a-178f. In this illustrative example, the array 174 is an 8×8, 64-pixel array, the first and second portions 180, 182 are each 3×8 and each have 24 pixels, and the third portion 184 is 2×8 and has 16 pixels. Alternative sizes for the first, second, and third portions are possible.

FIG. 10 schematically illustrates a table 186 for calculating fan speeds for the first and second ventilation assemblies 120a, 120b based on the values of the pixels 176 shown in the array 174 in FIG. 9, and the temperature thresholds 178 shown in FIG. 8. The table 186 can be part of the fan speed control algorithm 164 that is used by the controller 148 to determine appropriate fan speeds based on the values of the pixels 176 in the array 174.

FIG. 9 shows the value of the pixel 176 in the second portion 182 of the array 174 as having a value of 45° C. which exceeds the first temperature threshold 178a (i.e., 40° C.), but does not exceed the second temperature threshold 178b (i.e., 52° C.). The table 186 provides the first temperature threshold 178a with a count of 1 pixel, and the other temperature thresholds 178b-178f each have a count of 0 pixels because the remaining pixels all have values less than 40° C.

The fan speed control algorithm 164 when performed by the controller 148 uses the counts in the table 186 to determine fan speeds for powering the fans 124a, 124b by their respective electric motors 122a, 122b in the first and second ventilation assemblies 120a, 120b. This determination is based on a minimum number of pixels that is set for satisfying the temperature thresholds 178a-178f. For example, when the minimum number of pixels is set to one pixel, the first fan speed of the first temperature threshold 178a is selected by the controller 148 for the second ventilation assembly 120b because at least one pixel in the second and third portions 182, 184 of the array 174 satisfies the first temperature threshold 178a.

In contrast, when the minimum number of pixels is set to two, the controller 148 does not select a fan speed for the second ventilation assembly 120b because none of the temperature thresholds 178a-178f are satisfied by at least two pixels in the second and third portions 182, 184 of the array 174 shown in FIG. 9. In such a scenario, the controller 148 does not instruct the electric motor 122b to power the fan 124b such that the fan 124b remains idle.

While the above examples describe the minimum number of pixels as being set to at least one pixel or at least two pixels, in further examples, the minimum number of pixels can be set to at least three pixels, at least four pixels, at least five pixels, at least six pixels, and so on.

In some examples, the minimum number of pixels is set based on the type of heating by the cooking surface 10 such as gas, induction, electrical coil, radiant, and the like. In further examples, the minimum number of pixels is set based on a distance to the cooking surface 10 that can be detected by the sensor assembly 200. The adjustment of the minimum number of pixels allows the range hood 100 to be used with various types of cooking surfaces 10. In some further examples, the minimum number of pixels is set based on the type of food items and/or type of cooking on the cooking surface such as boiling pasta, grilling meat, stir-fry, and the like.

When the minimum number of pixels increases, the sensitivity of the fan speed control algorithm 164 decreases because an increased number of pixels must satisfy a particular threshold. When the minimum number of pixels decreases, the sensitivity of the fan speed control algorithm 164 increases because fewer pixels must satisfy a particular threshold. The highest sensitivity of the fan speed control algorithm 164 is established when the minimum number of pixels is set to one pixel because only one pixel needs to satisfy each threshold.

Additionally, the sensitivity of the fan speed control algorithm 164 can be adjusted based on the temperature thresholds 178a-178f. For example, when the first temperature threshold 178a is lowered from 40° C. to 35° C., the fans 124a, 124b will turn on more quickly because the lower threshold can be reached more quickly. Conversely, when the first temperature threshold 178a is increased from 40° C. to 45° C., the fans 124a, 124b will turn on more slowly because it will take longer for the burners 12 to reach the higher threshold.

The set minimum number of pixels can be stored in the memory device 162 such as during manufacture of the range hood 100. In such examples, the range hood 100 is preprogrammed to have a predetermined level of sensitivity. In some examples, the user interface 108 provides controls for a user to increase or decrease the sensitivity after installation of the range hood 100. In such examples, the minimum number of pixels are adjusted based on a selection of a sensitivity setting by the user. In some further examples, the user can adjust the sensitivity setting using a mobile application connected to the range hood 100.

In the example shown in FIG. 10, the controller 148 does not instruct the electric motor 122a to power the fan 124a of the first ventilation assembly 120a regardless of the set minimum number of pixels because none of the pixels in the first and third portions 180, 184 of the array 174 shown in FIG. 9 have values that exceed any of the temperature thresholds 178a-178f shown in FIG. 8. In this example, the fan 124a remains idle.

Figure 11:
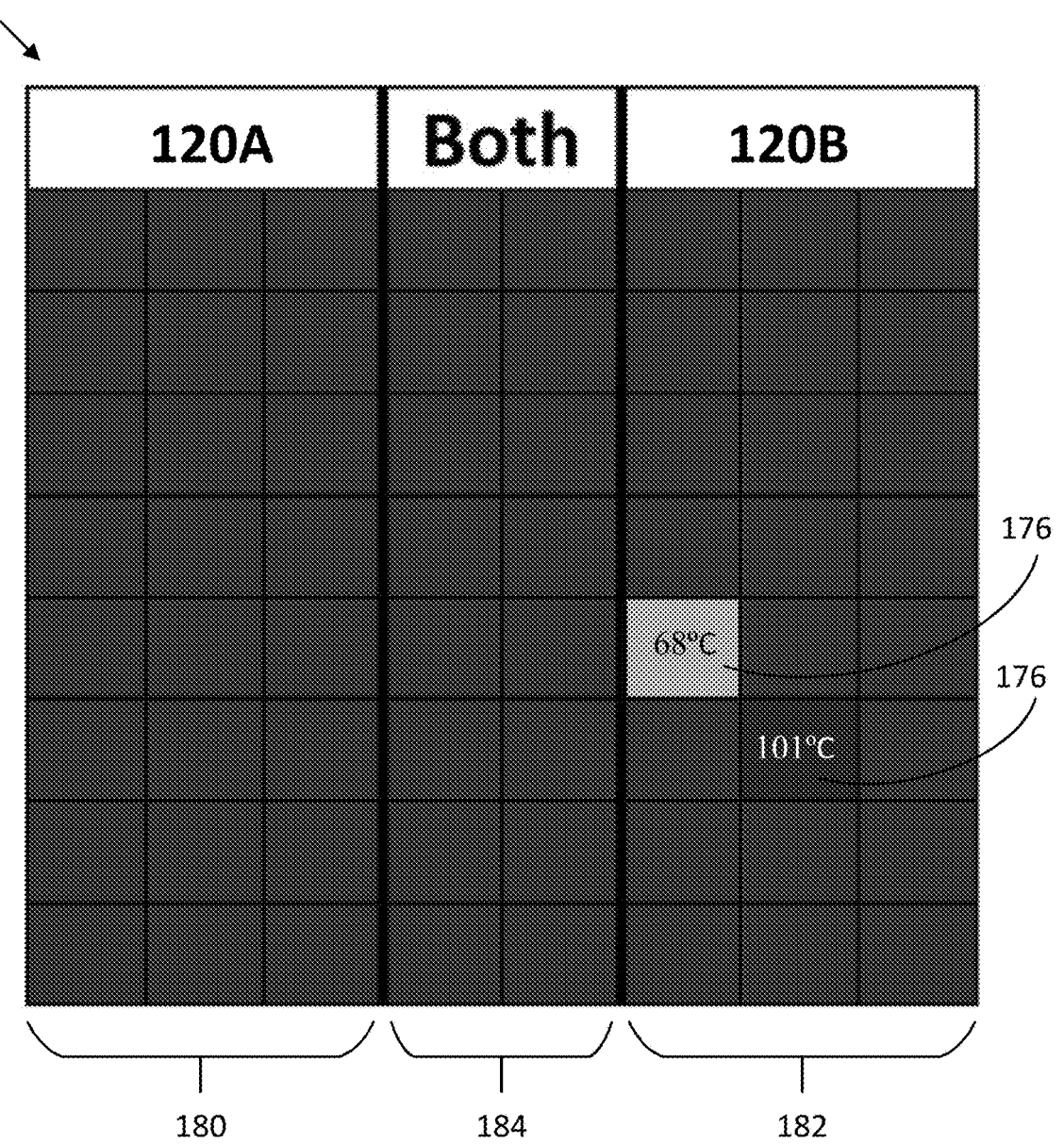
FIG. 11 illustrates another example of the array of FIG. 6 with at least two pixels having values that satisfy one or more temperature thresholds from FIG. 8.

FIG. 11 illustrates another example of the array 174 with at least two pixels having values that satisfy the temperature thresholds 178a-178f from FIG. 8. FIG. 12 schematically illustrates the table 186 for calculating the fan speeds based on the values of the pixels 176 shown in FIG. 11, and the temperature thresholds shown in FIG. 8.

Referring now to FIGS. 8, 11, and 12, when the minimum number of pixels is set to one pixel, the sixth fan speed associated with the sixth temperature threshold 178f is selected by the controller 148 for the second ventilation assembly 120b because at least one pixel in the second and third portions 182, 184 of the array 174 satisfies the sixth temperature threshold 178f.

In contrast, when the minimum number of pixels is set to two, the controller 148 selects the third fan speed associated with the third temperature threshold 178c for the fan 124b of the second ventilation assembly 120b because the third temperature threshold 178c (e.g., 64° C.) is satisfied by at least two pixels in the second and third portions 182, 184 of the array 174.

When the minimum number of pixels is set to three, the controller 148 does not select a fan speed for the second ventilation assembly 120b because none of the temperature thresholds 178a-178f are satisfied by at least three pixels in the second and third portions 182, 184 of the array 174. In such a scenario, the fan 124b remains idle.

In the example provided in FIGS. 8, 11, and 12, the controller 148 does not instruct the electric motor 122a to power the fan 124a of the first ventilation assembly 120a because none of the pixels 176 in the first and third portions 180, 184 of the array 174 shown in FIG. 11 have values that exceed any of the temperature thresholds 178a-178f shown in FIG. 8. In this example, the fan 124a of the first ventilation assembly 120a remains idle In the examples described above, the fan speed selected for the first ventilation assembly 120a is different from the fan speed selected for the second ventilation assembly 120b when the minimum number of pixels 176 in the first portion 180 of the array 174 have values satisfying a threshold higher than a highest threshold satisfied by the minimum number of pixels 176 in the second and third portions 182, 184 of the array 174. Also, the fan speed selected for the second ventilation assembly 120b is different from the fan speed selected for the first ventilation assembly 120a when the minimum number of pixels 176 in the second portion 182 of the array 174 have values satisfying a threshold higher than a highest threshold satisfied by the minimum number of pixels 176 in the first and third portions 180, 184 of the array 174.

The fan speed selected for the first ventilation assembly 120a equals the fan speed selected for the second ventilation assembly 120b when the minimum number of pixels 176 in the first portion 180 of the array 174 satisfy a highest threshold that is equal to a highest threshold satisfied by the minimum number of the pixels 176 in the second portion 182 of the array 174. Also, the fan speed selected for the first ventilation assembly 120a equals the fan speed selected for the second ventilation assembly 120b when the minimum number of pixels in the third portion 184 of the array 174 satisfy a threshold that is higher than highest thresholds satisfied by the pixels 176 in the first and second portions 180, 182 of the array 174.

Figure 13:
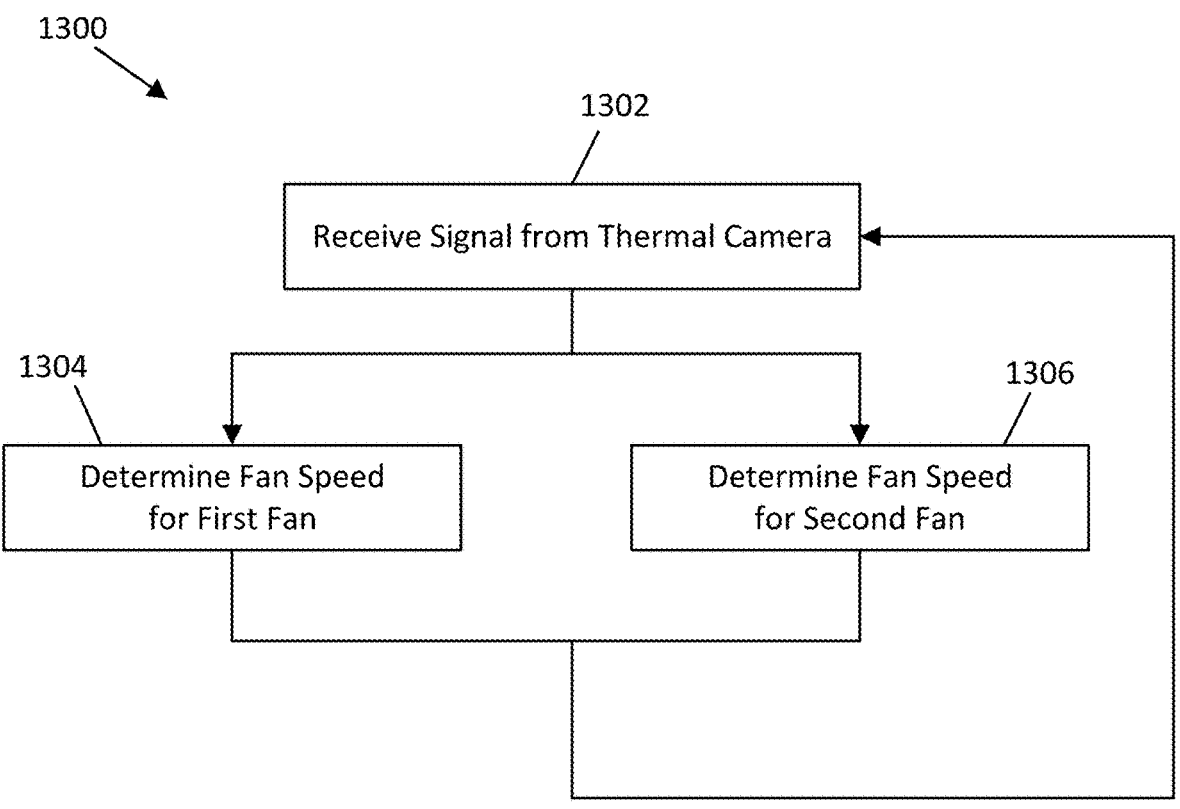
FIG. 13 schematically illustrates an example of a method of operating first and second ventilation assemblies of the range hood of FIG. 1.

FIG. 13 schematically illustrates an example of a method 1300 of operating the first and second ventilation assemblies 120a, 120b of the range hood 100. The method 1300 can be performed by the controller 148 using data acquired from the thermal camera 168. In some examples, the method 1300 is performed as part of the fan speed control algorithm 164 that is stored on the memory device 162 of the controller 148.

As shown in FIG. 13, the method 1300 includes an operation 1302 of receiving a signal from the thermal camera 168 detecting values for the plurality of pixels 176 in the array 174 segmented into the first portion 180 covering the area under the first side of the cavity 106, the second portion 182 covering the area under the second side of the cavity 106, and the third portion 184 covering the area overlapping the first and second sides of the cavity 106.

Next, the method 1300 includes an operation 1304 of determining a fan speed for the fan 124a driven by the electric motor 122a of the first ventilation assembly 120a by identifying the highest of the temperature thresholds 178a-178f satisfied by the minimum number of pixels 176 in the first and third portions 180, 184 of the array 174. The fan speed for the first ventilation assembly 120a can be determined in operation 1304 by using the table 186 shown in FIGS. 10 and 12. The fan speed selected from the table 186 in operation 1304 is an optimal fan speed for ventilating the area above the burners 12a, 12b, and 12c of the cooking surface 10.

In some examples, the temperature thresholds 178a-178f and/or the minimum number of pixels for determining the fan speed for the fan 124a in operation 1304 is adjustable based on the type of cooking surface (e.g., gas, induction, electrical coil, radiant, etc.), the distance between the range hood 100 and the cooking surface 10, the type of food items being cooked, and/or the type of cooking on the cooking surface (e.g., boiling, grilling, stir-frying, etc.).

In examples where the range hood 100 includes the second ventilation assembly 120b, the method 1300 further includes an operation 1306 of determining a fan speed for the fan 124b driven by the electric motor 122b of the second ventilation assembly 120b by identifying the highest of the temperature thresholds 178a-178f satisfied by the minimum number of pixels 176 in the second and third portions 182, 184 of the array 174. The fan speed can be determined in operation 1306 such as by using the table 186 shown in FIGS. 10 and 12. The fan speed selected from the table 186 in operation 1306 is an optimal fan speed for ventilating the area above the burners 12c, 12d, and 12e of the cooking surface 10.

In some examples, the temperature thresholds 178a-178f and/or the minimum number of pixels for determining the fan speed for the fan 124b in operation 1306 is adjustable based on the type of cooking surface (e.g., gas, induction, electrical coil, radiant, etc.), the distance between the range hood 100 and the cooking surface 10, the type of food items being cooked, and/or the type of cooking being done above the burners 12c, 12d, and 12e on the cooking surface (e.g., boiling, grilling, stir-frying, etc.). Thus, the method 1300 allows the first and second ventilation assemblies 120a, 120b to be independently controlled and operated.

As shown in FIG. 13, operations 1304, 1306 can occur simultaneously such that the controller 148 computes the fan speeds for the first and second ventilation assemblies 120a, 120b at substantially the same time. As shown in FIG. 13, the method 1300 repeats operations the 1302-1306 to update the optimal fan speeds for the first and second ventilation assemblies 120a, 120b based on changes on the cooking surface 10 detected from the thermal camera 168 during cooking. In some examples, the thermal camera 168 continuously monitors for temperature changes and the fan speeds are continuously updated based on the temperature changes.

In alternative examples, the thermal camera 168 checks for temperature changes during predetermined intervals of time (e.g., every 2, 5, 10 seconds, and the like), and the fan speeds of the first and second ventilation assemblies 120a, 120 are updated based on the temperature changes detected during the predetermined intervals of time. This can provide a smooth transition between the fan speeds of the ventilation assemblies by reducing fluctuation between the fan speeds while the temperature on the cooking surface 10 stabilizes.

Accordingly, when the temperatures of one or more areas on the cooking surface 10 increase during cooking, the fan speeds of the first and second ventilation assemblies 120a, 120b will automatically increase. Also, when cooking is completed such that the temperatures of the one or more areas on the cooking surface 10 gradually cool off, the fan speeds of the first and second ventilation assemblies 120a, 120b will automatically decrease and eventually shut off when the lowest of the temperature thresholds 178a-178f is no longer satisfied.

While the foregoing examples describe an automated mode of operation of the first and second ventilation assemblies 120a, 120b based on detected changes on the cooking surface 10, the range hood 100 can also provide controls to disable the automated operation. Such controls can be provided on, for example, the user interface 108. When disabled, the range hood 100 can operate under a manual mode of operation where the user can manually increase or decrease the fan speeds of the first and second ventilation assemblies 120a, 120b such as by using the one or more controls 158 provided on the user interface 108.

Figure 14:
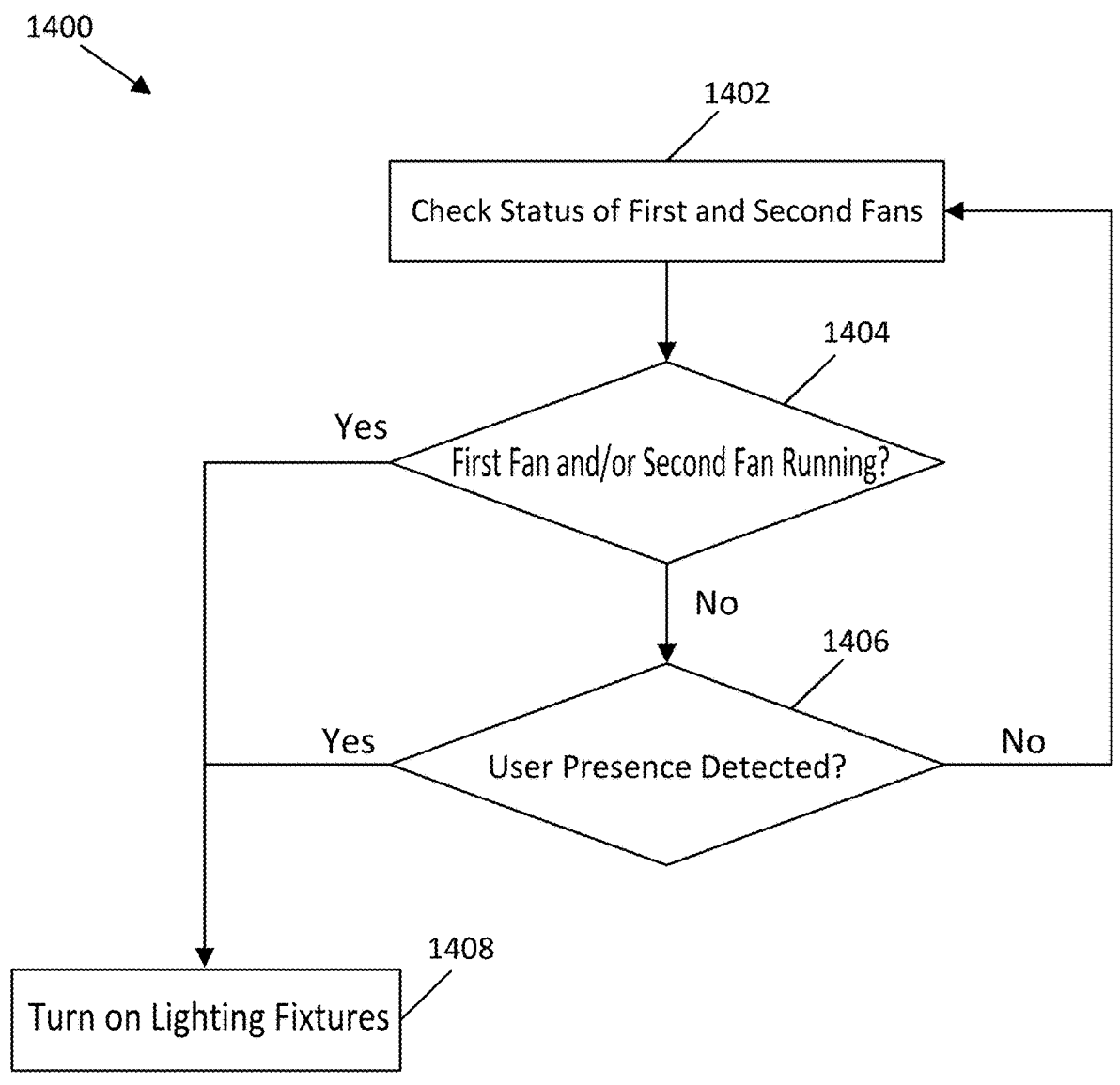
FIG. 14 schematically illustrates an example of a method of operating one or more light sources of the range hood of FIG. 1.

FIG. 14 schematically illustrates an example of a method 1400 of operating the one or more light sources 142 of the range hood 100. In certain examples, the method 1400 is performed by the controller 148 to automatically turn on the one or more light sources 142 of the range hood 100 without requiring any user input. The method 1400 can be performed as part of the light control algorithm 166 stored on the memory device 162 of the controller 148.

The method 1400 includes an operation 1402 of checking a status of the first and second ventilation assemblies 120a, 120*b*. When either one of the first and second ventilation assemblies 120*a*, 120*b* are being used to ventilate the cooking surface 10 under the range hood 100 (i.e., "Yes" at operation 1404), the method 1400 proceeds to operation 1408 where controller 148 turns on the one or more light sources 142 to illuminate the cooking surface.

When neither of the first and second ventilation assemblies 120*a*, 120*b* are being used to ventilate the cooking surface 10 under the range hood 100 (i.e., "No" at operation 1404), the method 1400 proceeds to an operation 1406 of determining whether motion is detected under the hood housing 102. This determination can be based on data received from the user detection sensor 170 such as time of flight data that can determine whether an object such as a user has moved relative to the range hood 100 or cooking surface 10. Alternatively, this determination can be based on data received from the thermal camera 168, such as based on detected changes in the values of the pixels in the array 174 that can occur due to a user moving their hand and arms across the cooking surface 10, or moving a cookware item 30 on the cooking surface.

When motion is detected under the hood housing 102 (i.e., "Yes" at operation 1406), the method 1400 proceeds to operation 1408 where controller 148 turns on the light sources 142 to illuminate the cooking surface. When motion is not detected under the hood housing 102 (i.e., "No" at operation 1406), the method 1400 returns to operation 1402. As shown in FIG. 14, the controller 148 can repeat the operations 1402-1406 to continuously determine whether to turn on the light sources 142 to illuminate the cooking surface 10. In this manner, the range hood 100 can automatically turn on the light sources 142 without requiring user input. In some further examples, the method 1400 can further include automatically turning off the light sources 142 when no motion is detected under the hood housing 102 after a predetermined amount of time.

Figure 15:
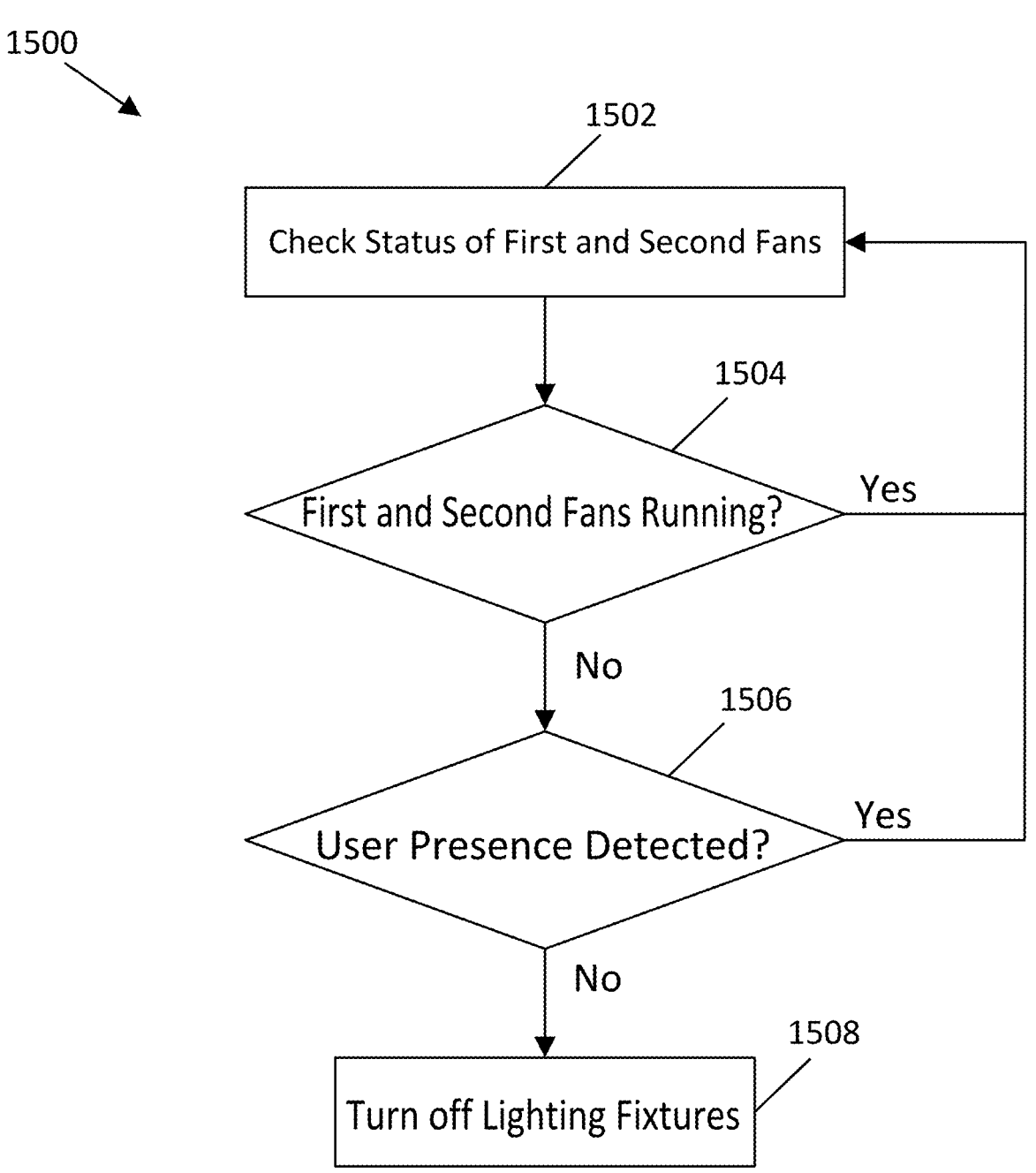
FIG. 15 schematically illustrates another example of a method of operating one or more light sources of the range hood of FIG. 1.

FIG. 15 schematically illustrates another example of a method 1500 of operating the one or more light sources 142 of the range hood 100. In certain examples, the method 1500 is performed by the controller 148 to automatically turn off the one or more light sources 142 without requiring any user input. The method 1500 can be performed as part of the light control algorithm 166 stored on the memory device 162 of the controller 148.

As shown in FIG. 15, the method 1500 includes an operation 1502 of checking a status of the first and second ventilation assemblies 120*a*, 120*b*. When at least one of the first and second ventilation assemblies 120*a*, 120*b* is being used to ventilate the cooking surface 10 under the range hood 100 (i.e., "Yes" at operation 1504), the method 1500 returns to operation 1502. Thus, the light sources 142 remain turned on while the either one or both of the first and second ventilation assemblies 120*a*, 120*b* are being used to ventilate the cooking surface 10.

When neither of the first and second ventilation assemblies 120*a*, 120*b* are in operation for ventilation of the cooking surface 10 (i.e., "No" at operation 1504), the method 1500 proceeds to operation 1506 of determining whether a user presence is detected within a predetermined amount of time. In some examples, the predetermined amount of time is about 10 seconds. In some further examples, the predetermined amount of time can be set or adjusted by a user of the range hood 100. When a user presence is detected (i.e., "Yes" at operation 1506), the method 1500 returns to operation 1502 such that the one or more light sources 142 remain turned on when a user presence is detected within the predetermined amount of time.

When a user presence is not detected within the predetermined amount of time (i.e., "No" at operation 1506), the method 1500 proceeds to operation 1508 where the controller 148 turns off the one or more light sources 142. In this manner, the controller 148 can automatically turn off the one or more light sources 142 without requiring user input to conserve energy, and thereby make the range hood 100 more energy efficient.

While the foregoing examples describe an automated mode of operation of the one or more light sources 142, the range hood 100 can also provide controls to disable the automated operation of the one or more light sources 142. Such controls can be provided on, for example, the user interface 108. When disabled, the range hood 100 can operate under a manual mode of operation where the user can manually turn on and off the one or more light sources 142 such as by using the one or more controls 158 provided on the user interface 108.

Figure 16:
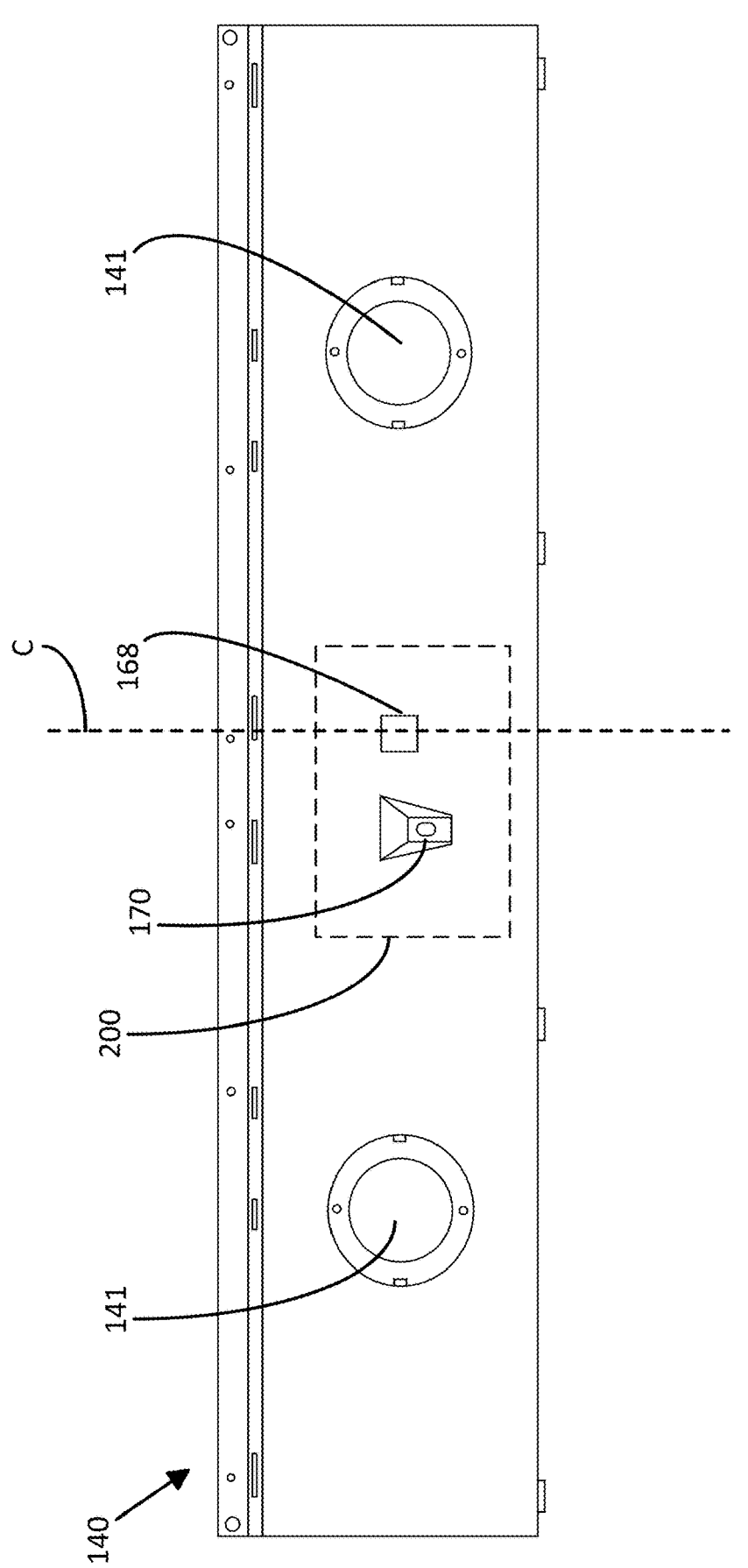
FIG. 16 is an exterior view of an example of a sensor assembly mounted to a lighting fixture holder of the range hood of FIG. 1.

FIG. 16 is an exterior view of an example of the sensor assembly 200 mounted to the lighting fixture holder 140 of the range hood 100 (see also FIG. 4). In this example, the sensor assembly 200 includes the thermal camera 168 and the user detection sensor 170. Additionally, in this example the sensor assembly 200 is positioned in a central location on the lighting fixture holder 140 between apertures 141 for the light sources 142. In this example, the thermal camera 168 and the user detection sensor 170 are horizontally aligned, and the thermal camera 168 is mounted for alignment with a central axis C of the lighting fixture holder 140.

Figure 17:
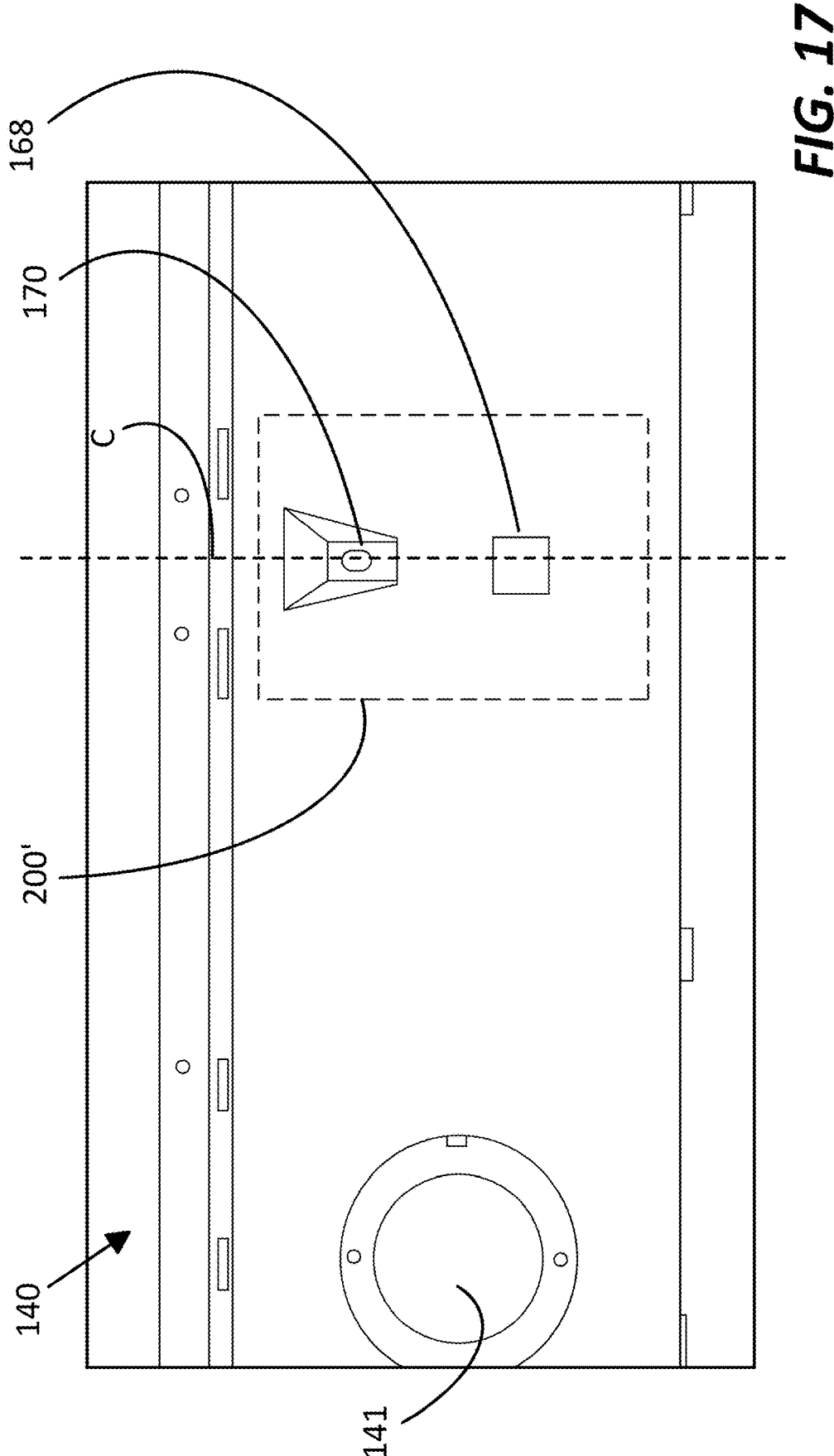
FIG. 17 is an exterior view of another example of the sensor assembly mounted to the lighting fixture holder of the range hood of FIG. 1.

FIG. 17 is an exterior view of another example of a sensor assembly 200' mounted to the lighting fixture holder 140. Like in the example described above, the sensor assembly 200' includes the thermal camera 168 and the user detection sensor 170, and the sensor assembly 200' is positioned in a central location on the lighting fixture holder 140 between apertures 141 for the light sources 142. In this example, the thermal camera 168 and the user detection sensor 170 are vertically aligned such that both the thermal camera 168 and the user detection sensor 170 are mounted for alignment with the central axis C of the lighting fixture holder 140.

In the examples shown in FIGS. 4, 16, and 17, the thermal camera 168 is positioned in a central location toward a front end of the hood housing 102. For example, the thermal camera 168 positioned on the lighting fixture holder 140 between the light sources 142, and the lighting fixture holder 140 is installed toward the front end of the hood housing 102. In some examples, the thermal camera 168 is angled relative to the lighting fixture holder 140.

The placement and orientation of the thermal camera 168 on the range hood 100 can increase the field of view for the thermal camera 168 allowing the thermal camera 168 to capture temperature values across the entire surface area of the cooking surface 10, and to optimize heat detection from a variety of different types of cooking surfaces. Additionally, the placement and orientation of the thermal camera 168 can allow the range hood 100 to have a single thermal camera rather than multiple temperature sensors positioned in different areas of the range hood, which can simplify the manufacture and operation of the range hood.

Figure 18:
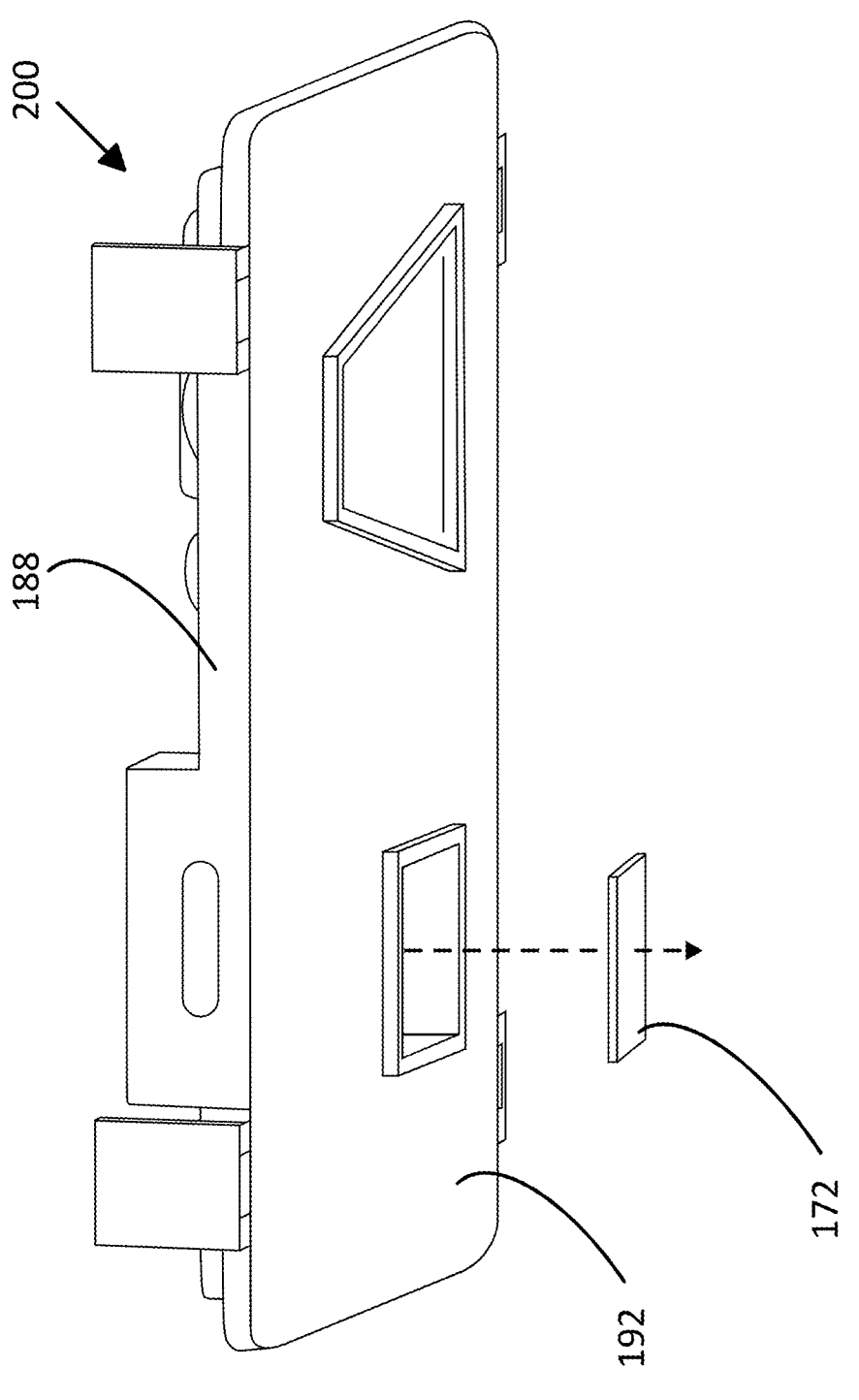
FIG. 18 is a bottom exploded view of the sensor assembly of FIG. 16.
Figure 19:
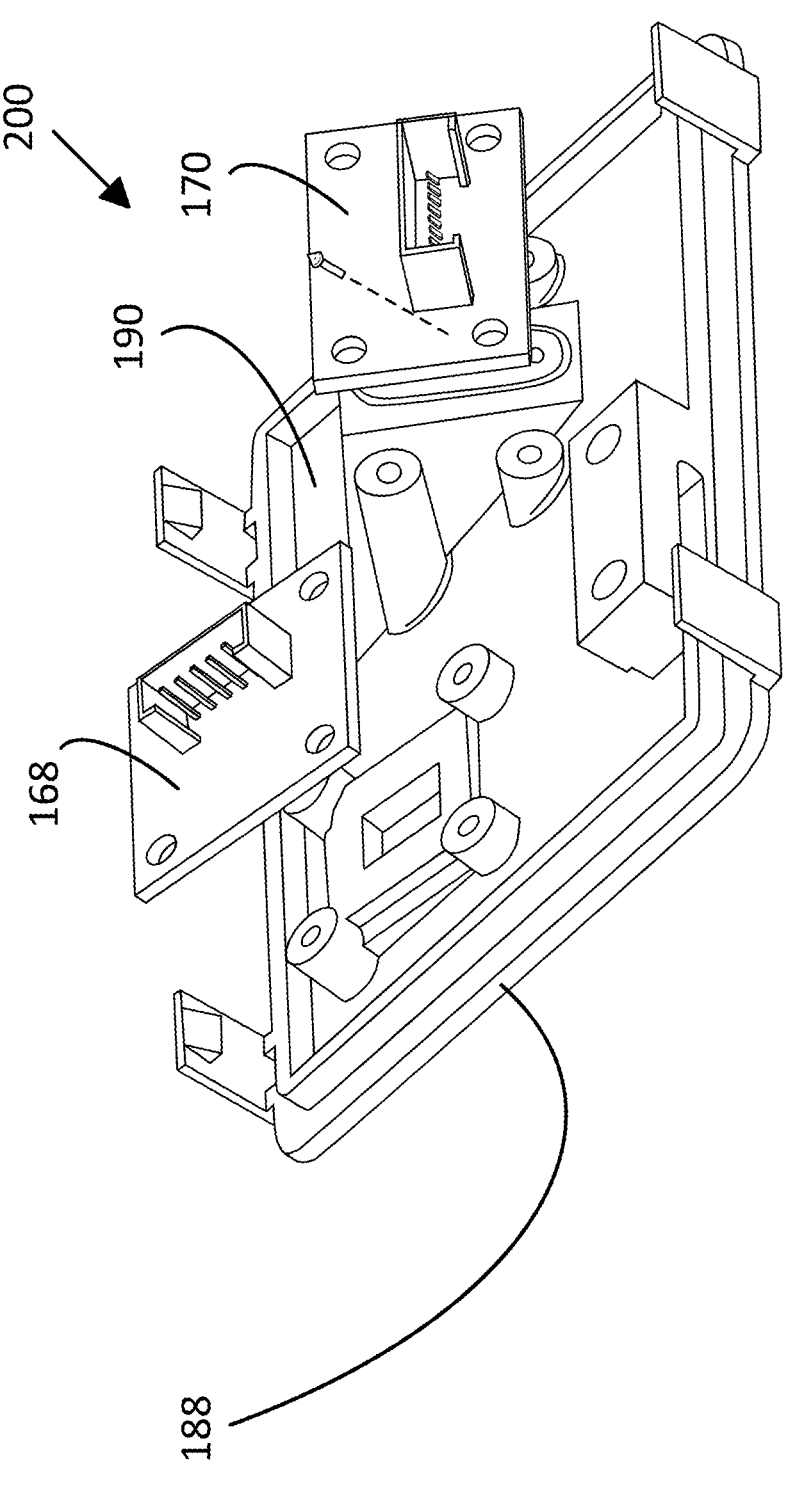
FIG. 19 is top exploded view of the sensor assembly of FIG. 16.

FIG. 18 is a bottom exploded view of the sensor assembly 200. FIG. 19 is top exploded view of the sensor assembly 200. As shown in FIGS. 18 and 19, the thermal camera 168 and the user detection sensor 170 are mounted to an interior surface 190 of a base 188 of the sensor assembly 200. The thermal camera 168 and the user detection sensor 170 can be mounted to the interior surface 190 of the base 188 by fasteners such as screws, and the like.

As shown in FIG. 19, the user detection sensor 170 is angled with respect to the base 188. The angle of the user detection sensor 170 increases the field of view of the user detection sensor 170 allowing the sensor to detect motion both under and in front of the range hood. This can improve motion detection for determining presence of a user of the range hood 100.

As shown in FIG. 19, the thermal camera 168 is also angled relative to the base 188. The angle of the thermal camera 168 relative to the base 188 allows the field of view of the thermal camera 168 to be optimally directed toward the cooking surface 10. In some examples, the angle of the thermal camera 168 relative to the base 188 is less than the angle of the user detection sensor 170 with respect to the base 188 such that the thermal camera 168 is more planar for covering the cooking surface 10, while the user detection sensor 170 is more vertical for covering both the cooking surface 10 and the area in front of the range hood 100.

As shown in FIG. 18, a lens 172 mounts to an exterior surface 192 of the base 188 to cover the thermal camera 168 and thereby protect the thermal camera 168 from harsh environmental conditions under the range hood 100 such as heat, steam, humidity, smoke, soot, grease particles, and the like from cooking on the cooking surface 10. In some examples, the lens 172 is fixed to the base 188 by a fastener such as glue. The lens 172 is configured for use with the thermal camera 168 by allowing infrared signals including long wave infrared (LWIR) signals to pass through the lens 172. In some examples, the lens 172 is made of a silicon material that allows for high transmissivity of long-wavelength infrared light (LWIR).

Figure 20:
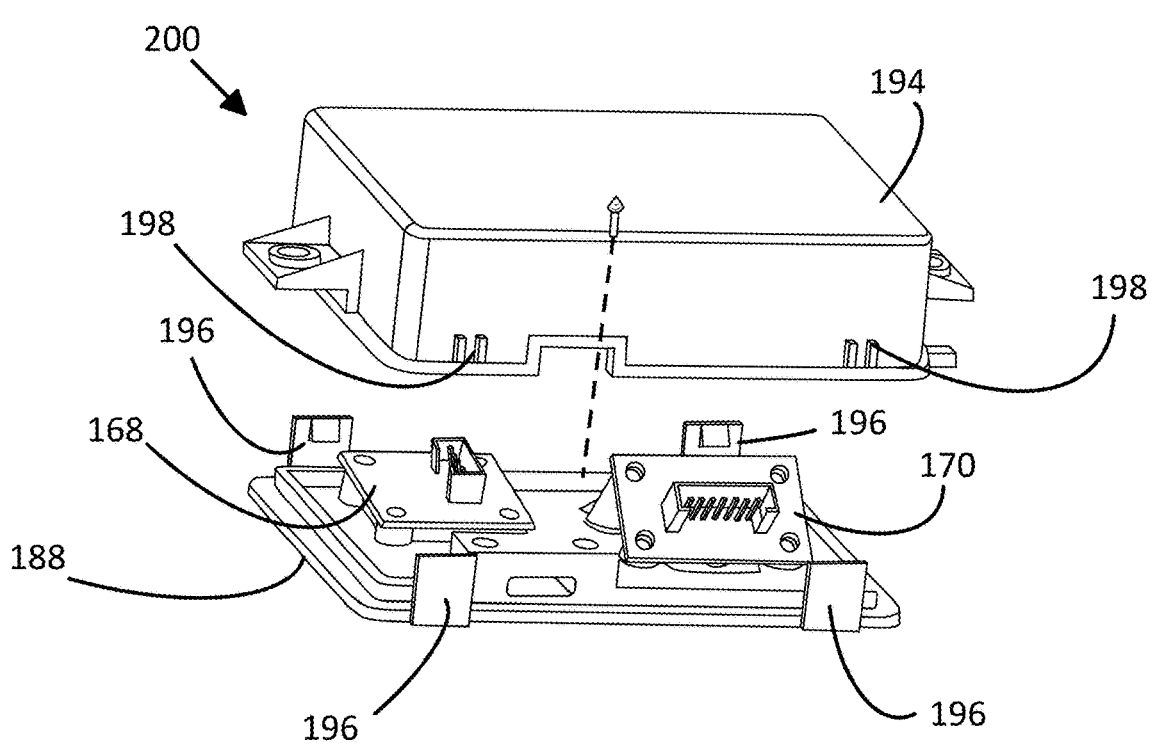
FIG. 20 is a view of a cover positioned relative to a base of the sensor assembly of FIG. 16.
Figure 21:
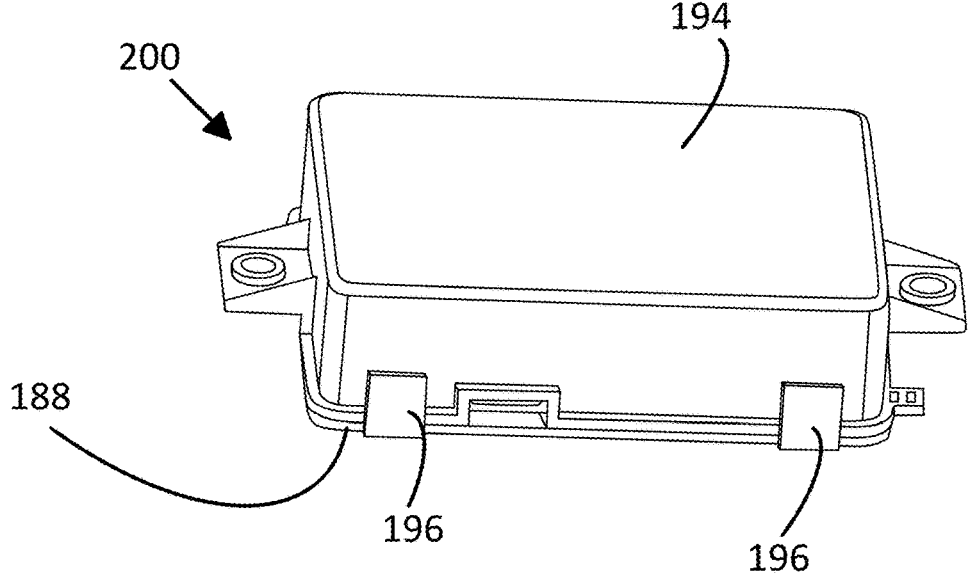
FIG. 21 is an isometric view of the cover mounted to the base of the sensor assembly of FIG. 16.

FIG. 20 is a view of a cover 194 positioned relative to the base 188 of the sensor assembly 200. FIG. 21 is an isometric view of the cover 194 mounted to the base 188 of the sensor assembly 200. As shown in FIGS. 20 and 21, the cover 194 attaches to the baseboard by one or more latches 196 on the base 188 that can removably engage one or more surfaces 198 on the cover 194. In this example, the cover 194 snap-fits onto the base 188.

Figure 22:
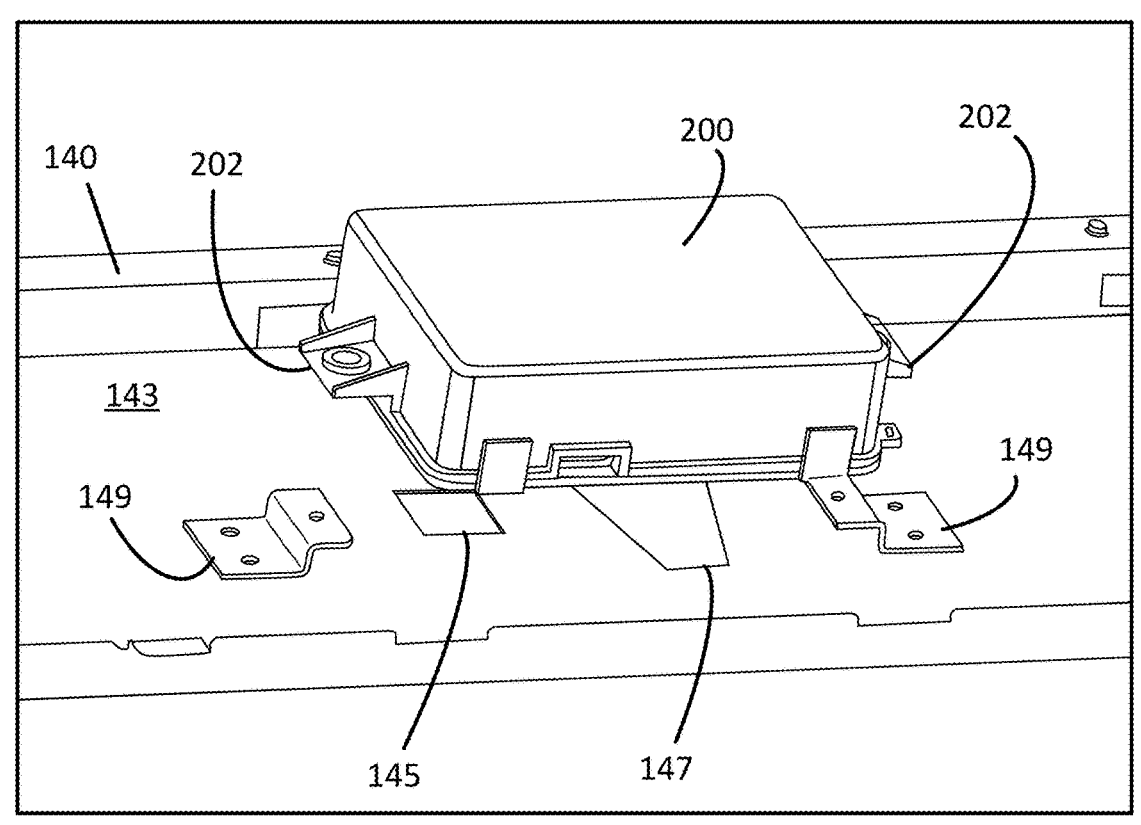
FIG. 22 is an exploded view of the enclosure for the sensor assembly relative to an interior surface of the lighting fixture holder of FIG. 16.
Figure 23:
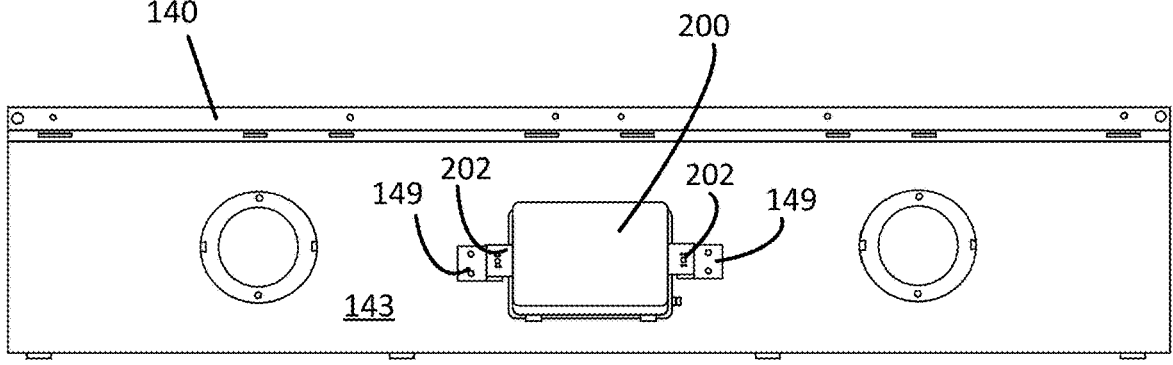
FIG. 23 is a top view of the enclosure for the sensor assembly mounted to the interior surface of the lighting fixture holder of FIG. 16.

FIG. 22 is a view of the sensor assembly 200 positioned relative to an interior surface 143 of the lighting fixture holder 140. FIG. 23 is a view of the sensor assembly 200 mounted to the interior surface 143 of the lighting fixture holder 140. As shown in FIGS. 22 and 23, the lighting fixture holder 140 includes apertures 145, 147 that align with the thermal camera 168 and the user detection sensor 170, respectively. As further shown, the sensor assembly 200 includes arms 202 that can each receive a fastener such as a screw for attaching the arms 202 to brackets 149 on the lighting fixture holder 140. The brackets 149 are fixed to the interior surface 143 of the lighting fixture holder 140 by a fastener such as glue or welding.

Figure 24:
FIG. 24 is a cross-sectional view of the range hood of FIG. 1.

FIG. 24 is a cross-sectional view of the range hood 100. As shown in FIG. 24, the placement of the sensor assembly 200 on the lighting fixture holder 140, such as between the apertures 141 for the light sources 142, can reduce exposure of the thermal camera 168 to contaminants such as steam, humidity, smoke, soot, grease particles, and the like that can result from cooking on the cooking surface 10 because the thermal camera 168 is not in the path of the airflow generated by the first and second ventilation assemblies 120a, 120b. Instead, the thermal camera 168 is offset from the path of the airflow. This can prevent the build-up of grease and sook around the thermal camera 168 which can negatively impact its operation.

Also, the placement of the user detection sensor 170 on the lighting fixture holder 140, such as between the apertures 141 for the light sources 142, can improve detection of user presence. The placement of the user detection sensor 170 can also reduce exposure to contaminants such as steam, humidity, smoke, soot, grease particles, and the like from cooking on the cooking surface 10 because the user detection sensor 170 is not positioned in the path of the airflow generated by operation of the first and second ventilation assemblies 120a, 120b.

The various embodiments described above are provided by way of illustration only and should not be construed to be limiting in any way. Various modifications can be made to the embodiments described above without departing from the true spirit and scope of the disclosure.

What is claimed is:

1. An automated range hood for ventilating a cooking surface, the automated range hood comprising:
   a hood housing;
   a ventilation assembly mounted in the hood housing, the ventilation assembly including:
      an electric motor; and
      a fan driven by the electric motor to ventilate the cooking surface;
   a thermal camera measuring temperature values for a plurality of pixels in an array covering the cooking surface, wherein the array is segmented into a first portion under a first side of the hood housing, a second portion under a second side of the hood housing, and a third portion under a central portion overlapping the first and second portions; and
   a controller including:
      at least one processing device; and
      at least one memory device storing software instructions that, when executed by the at least one processing device, cause the controller to:
         select a fan speed from a plurality of fan speeds for the electric motor to drive the fan, the fan speed selected by identifying a highest temperature threshold from a plurality of temperature thresholds satisfied by a minimum number of pixels in the array, wherein a first fan speed is selected from the plurality of fan speeds by identifying a highest temperature threshold from the plurality of temperature thresholds satisfied by the minimum number of pixels in the first and third portions of the array, wherein the first fan speed is associated with a first ventilation assembly.

2. The automated range hood of claim 1, further comprising:
   a second ventilation assembly mounted in the hood housing, the second ventilation assembly including:
      a second electric motor; and
      a second fan driven by the second electric motor.

3. The automated range hood of claim 2, wherein the at least one memory device stores further software instructions that, when executed by the at least one processing device, cause the controller to:
   select a second fan speed from the plurality of fan speeds for the second electric motor to drive the second fan, the second fan speed selected by identifying a highest temperature threshold from the plurality of temperature thresholds satisfied by the minimum number of pixels in the second and third portions of the array, wherein the second fan speed is associated with the second ventilation assembly.

4. The automated range hood of claim 1, wherein the minimum number of pixels is based on at least one of a type of the cooking surface and a distance to the cooking surface.

5. The automated range hood of claim 1, wherein the software instructions, when executed by the at least one processing device, further cause the controller to:

turn on one or more light sources to illuminate the cooking surface when motion is detected under the hood housing.

6. The automated range hood of claim 1, wherein the software instructions, when executed by the at least one processing device, further cause the controller to:

turn on one or more light sources to illuminate the cooking surface when at least one temperature threshold of the plurality of temperature thresholds is satisfied by the minimum number of pixels in the array.

7. A controller for a range hood, the controller comprising:

at least one processing device; and at least one memory device storing software instructions that, when executed by the at least one processing device, cause the controller to:

receive temperature values from a thermal camera, the temperature values being captured for a plurality of pixels in an array segmented into one or more portions, wherein the array is segmented into a first portion under a first side of the range hood, a second portion under a second side of the range hood, and a third portion under a central portion of the range hood overlapping the first and second portions; and select a fan speed from a plurality of fan speeds for a ventilation assembly, the fan speed selected by identifying a highest temperature threshold from a plurality of temperature thresholds satisfied by a minimum number of pixels in the array, wherein a first fan speed is selected from the plurality of fan speeds by identifying a highest temperature threshold from the plurality of temperature thresholds satisfied by the minimum number of pixels in the first and third portions of the array, wherein the first fan speed is associated with a first ventilation assembly.

8. The controller of claim 7, wherein the at least one memory device stores further software instructions that, when executed by the at least one processing device, cause the controller to:

select a second fan speed from the plurality of fan speeds for a second electric motor to drive a second fan, the second fan speed selected by identifying a highest temperature threshold from the plurality of temperature thresholds satisfied by the minimum number of pixels in the second and third portions of the array, wherein the second fan speed is associated with a second ventilation assembly.

9. The controller of claim 7, wherein the at least one memory device stores further software instructions that, when executed by the at least one processing device, cause the controller to:

turn on one or more light sources to illuminate the cooking surface when motion is detected under the hood housing.

10. The controller of claim 7, wherein the at least one memory device stores further software instructions that, when executed by the at least one processing device, cause the controller to:

turn on one or more light sources to illuminate the cooking surface when at least one temperature threshold of the plurality of temperature thresholds is satisfied by the minimum number of pixels in the array.

11. A method of ventilating a cooking surface, the method comprising:

receiving temperature values from a thermal camera, the temperature values being captured for a plurality of pixels in an array segmented into one or more portions, wherein the array is segmented into a first portion of the cooking surface, a second portion of the cooking surface, and a third portion of the cooking surface overlapping the first and second portions; and selecting a fan speed from a plurality of fan speeds for a ventilation assembly, the fan speed selected by identifying a highest temperature threshold from a plurality of temperature thresholds satisfied by a minimum number of pixels in the array, wherein a first fan speed is selected from the plurality of fan speeds by identifying a highest temperature threshold from the plurality of temperature thresholds satisfied by the minimum number of pixels in the first and third portions of the array, wherein the first fan speed is associated with a first ventilation assembly.

12. The method of claim 11, further comprising:

selecting a second fan speed from the plurality of fan speeds for a second electric motor to drive a second fan, the second fan speed selected by identifying a highest temperature threshold from the plurality of temperature thresholds satisfied by the minimum number of pixels in the second and third portions of the array, wherein the second fan speed is associated with a second ventilation assembly.

13. The method of claim 11, further comprising:

turning on one or more light sources to illuminate the cooking surface when motion is detected under the hood housing.

14. The method of claim 11, further comprising:

turning on one or more light sources to illuminate the cooking surface when at least one temperature threshold of the plurality of temperature thresholds is satisfied by the minimum number of pixels in the array.

* * * * *